(12) United States Patent
Kapur et al.

(10) Patent No.: US 7,346,629 B2
(45) Date of Patent: Mar. 18, 2008

(54) SYSTEMS AND METHODS FOR SEARCH PROCESSING USING SUPERUNITS

(75) Inventors: Shyam Kapur, Sunnyvale, CA (US); Jignashu Parikh, Gujarat (IN); Deepa Joshi, Santa Clara, CA (US)

(73) Assignee: Yahoo! Inc., Sunnyvale, CA (US)

( * ) Notice: Subject to any disclaimer, the term of this patent is extended or adjusted under 35 U.S.C. 154(b) by 544 days.

(21) Appl. No.: 10/797,614

(22) Filed: Mar. 9, 2004

(65) Prior Publication Data

US 2005/0080795 A1     Apr. 14, 2005

Related U.S. Application Data

(60) Provisional application No. 60/510,220, filed on Oct. 9, 2003.

(51) Int. Cl.
*G06F 17/30* (2006.01)
*G06F 15/16* (2006.01)

(52) U.S. Cl. .................. 707/104.1; 707/101; 707/3; 707/5; 707/6; 707/7

(58) Field of Classification Search .............. 707/104.1
See application file for complete search history.

(56) References Cited

U.S. PATENT DOCUMENTS

| | | | |
|---|---|---|---|
| 5,754,938 A * | 5/1998 | Herz et al. | 725/116 |
| 5,819,258 A * | 10/1998 | Vaithyanathan et al. | 707/2 |
| 6,006,221 A | 12/1999 | Abbott | |
| 6,076,088 A | 6/2000 | Paik et al. | |
| 6,363,373 B1 | 3/2002 | Steinkraus | |
| 6,539,348 B1 | 3/2003 | Bond | |
| 6,675,159 B1 | 1/2004 | Lin et al. | |
| 6,684,205 B1 * | 1/2004 | Modha et al. | 707/3 |
| 6,772,150 B1 | 8/2004 | Whitman et al. | |
| 7,031,980 B2 * | 4/2006 | Logan et al. | 707/104.1 |
| 7,085,771 B2 * | 8/2006 | Chung et al. | 707/102 |
| 2003/0069880 A1 | 4/2003 | Harrison et al. | |
| 2003/0182310 A1* | 9/2003 | Charnock et al. | 707/104.1 |

OTHER PUBLICATIONS

Craig Silverstein, Monika Henzinger, Hannes Marais, and Michael Moricz. Analysis of a Very Large AltaVista Query Log, SRC Technical note #1998-14. On-line at http://gatekeeper.dec.com/pub/DEC/SRC/technical-notes/abstracts/src-tn-1998-014.html http://citeseer.ist.psu.edu/silverstein98analysis.html.*

(Continued)

*Primary Examiner*—Jeffrey Gaffin
*Assistant Examiner*—Mark Andrew Radtke
(74) *Attorney, Agent, or Firm*—Seth H. Ostrow; Dreier LLP

(57) ABSTRACT

In a search processing system, a concept network is generated from a set of queries by parsing the queries into units and defining various relationships between the units based in part on patterns of units that appear together in queries. Units in the concept network that have some similar characteristic(s) are grouped into superunits. For each superunit, there is a corresponding signature that defines the similar characteristic of the group. A query is processed by identifying constituent units, determining the superunit membership of some or all of the constituent units, and using that information to formulate a response to the query.

46 Claims, 12 Drawing Sheets

OTHER PUBLICATIONS

Srivastava, J., Cooley, R., Deshpande, M., and Tan, P. 2000. Web usage mining: discovery and applications of usage patterns from Web data. SIGKDD Explor. Newsl. 1,2 (Jan. 2000), 12-23. DOI= http://doi.acm.org/10.1145/846183.846188.*

Modha, D. S. and Spangler, W. S. 2000. Clustering hypertext with applications to web searching. In Proceedings of the Eleventh ACM on Hypertext and Hypermedia (San Antonio, Texas, United States, May 30-Jun. 3, 2000). HYPERTEXT '00. ACM Press, New York, NY, 143-152. DOI= http://doi.acm.org/10.1145/336296.336351.*

Botafogo, R. A. 1993. Cluster analysis for hypertext systems. In Proceedings of the 16th Annual international ACM SIGIR Conference on Research and Development in information Retrieval (Pittsburgh, Pennsylvania, United States, Jun. 27-Jul. 1, 1993). R. Korfhage, E. Rasmussen, and P. Willett, Eds. SIGIR '93. ACM Press, New York, NY, 116-125.*

Xiaofeng He; Ding, C.H.Q.; Hongyuan Zha; Simon, H.D., "Automatic topic identification using webpage clustering," Data Mining, 2001. ICDM 2001, Proceedings IEEE International Conference on, vol., No. pp. 195-202, 2001.*

* cited by examiner

| Rank | Unit | Weight W($x_i$) |
|---|---|---|
| 1 | "side effects" | 2535.1081555555 |
| 2 | "dosage" | 1715.60970691241 |
| 3 | "overdose" | 1012.67890927915 |
| 4 | "generic" | 962.26525161571 |
| 5 | "withdrawal" | 903.478068429062 |
| 6 | "addiction" | 374.038397276877 |

FIG. 10A

| Rank | Unit | Weight W($x_i$) |
|---|---|---|
| 1 | <brand A> | 5058.45052935936 |
| 2 | <brand B> | 4986.57847034358 |
| 3 | <brand C> | 4686.94999118965 |
| 4 | <brand D> | 4443.85674161793 |
| 5 | <brand E> | 4395.6107815323 |
| 6 | <brand F> | 4362.31743340316 |
| 7 | <brand G> | 4359.4591947467 |
| 8 | <brand H> | 4141.491219357 |
| 9 | <brand I> | 4008.98929826121 |
| 10 | <brand J> | 3834.00725848058 |
| 11 | <brand K> | 3831.09009064923 |
| 12 | <brand L> | 3769.71768473659 |
| 13 | <brand M> | 3681.19081682748 |
| ... | | |
| 19 | "ibuprofen" | 3238.3484470847 |
| ... | | |
| 61 | "drug" | 1818.41003172791 |
| 62 | <brand N> | 1783.6272487977 |
| 63 | <brand O> | 1771.02988169388 |
| 64 | <brand P> | 1768.27751636375 |
| 65 | "caffeine" | 1763.63682236685 |
| ... | | |
| 87 | "chemotherapy" | 1407.43386959684 |
| ... | | |
| 102 | "heroin" | 1161.6056979906 |
| 103 | "aspartame" | 1151.13482596151 |
| ... | | |
| 117 | <brand R> | 1009.537793315373 |

FIG. 10B

SYSTEMS AND METHODS FOR SEARCH PROCESSING USING SUPERUNITS

CROSS-REFERENCES TO RELATED APPLICATIONS

This application claims the benefit of U.S. Provisional Application No. 60/510,220, filed Oct. 9, 2003, entitled "Systems and Methods for Search Processing Using Clustering of Units," which disclosure is incorporated herein by reference for all purposes.

The present disclosure is related to commonly assigned U.S. application Ser. No. 10/713,576, filed Nov. 12, 2003, entitled "Systems and Methods for Generating Concept Units from Search Queries," and to commonly assigned Provisional Application No. 60/460,222, filed Apr. 4, 2003, entitled "Universal Search Interface System and Methods." The respective disclosures of these applications are incorporated herein by reference for all purposes.

BACKGROUND OF THE INVENTION

The present invention relates generally to network and Internet search and interface systems and more particularly to search systems that provide enhanced search functionality.

With the advent of the Internet and the multitude of web pages and media content available to a user over the World Wide Web (web), there has become a need to provide users with streamlined approaches to filter and obtain desired information from the web. Search systems and processes have been developed to meet the needs of users to obtain desired information. Examples of such technologies can be accessed through Yahoo!, Google and other sites. Typically, a user inputs a query and a search process returns one or more links (in the case of searching the web), documents and/or references (in the case of a different search corpus) related to the query. The links returned may be closely related, or they may be completely unrelated, to what the user was actually looking for. The "relatedness" of results to the query may be in part a function of the actual query entered as well as the robustness of the search system (underlying collection system) used. Relatedness might be subjectively determined by a user or objectively determined by what a user might have been looking for.

Queries that users enter are typically made up of one or more words. For example, "hawaii" is a query, so is "new york city", and so is "new york city law enforcement". As such, queries as a whole are not integral to the human brain. In other words, human beings do not naturally think in terms of queries. They are an artificial construct imposed, in part, by the need to query search engines or look up library catalogs. Human beings do not naturally think in terms of just single words either. What human beings think in terms of are natural concepts. For example, "hawaii" and "new york city" are vastly different queries in terms of length as measured by number of words but for a human being they share one important characteristic: they are each made up of one concept. In contrast, a person regards the query "new york city law enforcement" as fundamentally different because it is made up of two distinct concepts: "new york city" and "law enforcement".

Human beings also think in terms of logical relationships between concepts. For example, "law enforcement" and "police" are related concepts since the police are an important agency of law enforcement; a user who types in one of these concepts may be interested in sites related to the other concept even if those sites do not contain the particular word or phrase the user happened to type. As a result of such thinking patterns, human beings by nature build queries by entering one or more natural concepts, not simply a variably long sequence of single words, and the query generally does not include all of the related concepts that the user might be aware of. Also, the user intent is not necessarily reflected in individual words of the query. For instance, "law enforcement" is one concept, while the separate words "law" and "enforcement" do not individually convey the same user intent as the words combined.

Current technologies at any of the major search providers, e.g., MSN, Google or any other major search engine site, do not understand queries the same way that human beings create them. For instance, existing search engines generally search for the exact words or phrases the user entered, not for the underlying natural concepts or related concepts the user actually had in mind. This is perhaps the most important reason that prevents search providers from identifying a user's intent and providing optimal search results and content.

As can be seen, there is a need for improved search and interface technology that aids in providing results that are more in line with the actual concepts in which a user may be interested and a better user experience.

BRIEF SUMMARY OF THE INVENTION

Embodiments of the present invention provide systems and methods for processing search requests, including analyzing received queries in order to provide a more sophisticated understanding of the information being sought. A concept network is generated from a set of queries by parsing the queries into units and defining various relationships between the units, e.g., based on patterns of units that appear together in queries. From the concept network, various similarities between different units can be detected, and units that have some identifying characteristic(s) in common may be grouped into superunits. For each superunit, there is a corresponding signature that defines the identifying characteristic(s) of the group. A query can be processed by identifying constituent units, determining the superunit membership of some or all of the constituent units, and using that information to formulate a response to the query.

According to one aspect of the invention, a computer-implemented method for generating superunits from user search queries is provided. A number of previous queries is represented as a concept network, the concept network including units and relationships defined between pairs of the units, wherein each relationship has an associated edge weight. A superunit seed is identified; the superunit seed has at least one member unit, wherein each member unit is one of the plurality of units of the concept network. A signature is defined for the superunit seed. The signature includes one or more signature units, and each signature unit has a relationship in the concept network with at least a minimum number of the member units. The superunit seed is then expanded by adding one or more new member units from the concept network, wherein each new member unit satisfies a match criterion based on the signature. The signature is modified based on the expanded superunit seed. The steps of expanding and modifying are repeated until a convergence criterion is satisfied, and a final superunit and a final signature are formed once the convergence criterion is satisfied. Superunit membership information for each member unit of the final superunit is then stored and may be used in responding to subsequent queries. The superunit membership information may include, for example, a membership weight for each member unit of the final superunit, where the membership weight is based on the relationships in the concept network between the member unit and the signature units of the final signature.

According to another aspect of the present invention, a system for generating superunits from user search queries includes a concept network builder module, a superunit seed module, a superunit builder module, and a storage module. The concept network builder module is configured to generate a concept network from a set of previous queries; the concept network includes units and relationships defined between pairs of units, wherein each relationship has an associated edge weight. The superunit seed module is configured to identify a superunit seed comprising at least one member unit, wherein each member unit is one of the units of the concept network. The superunit builder module is configured to construct superunits and signatures starting with the superunit seeds. Each superunit includes a plurality of member units, and each signature is associated with one of the superunits. Each signature includes one or more signature units, where each signature unit has a relationship in the concept network with at least a minimum number of the member units of the associated superunit. The storage module configured to store superunit membership information for the member units; the superunit membership information is provided by the superunit builder module. In some embodiments, the system also includes a query response module coupled to the storage module and configured to receive a current query. The query response module parses the current query into one or more constituent units, retrieves from the storage module the superunit membership information for one or more of the constituent units, and formulates a response to the current query based at least in part on the retrieved superunit membership information.

The following detailed description together with the accompanying drawings will provide a better understanding of the nature and advantages of the present invention.

BRIEF DESCRIPTION OF THE DRAWINGS

FIG. 10 shows an example result of the superunit generation process of FIG. 7, with FIG. 10A showing signature units and FIG. 10B showing representative superunit members.

DETAILED DESCRIPTION OF THE INVENTION

I. Overview

A. Network Implementation

Figure 1:
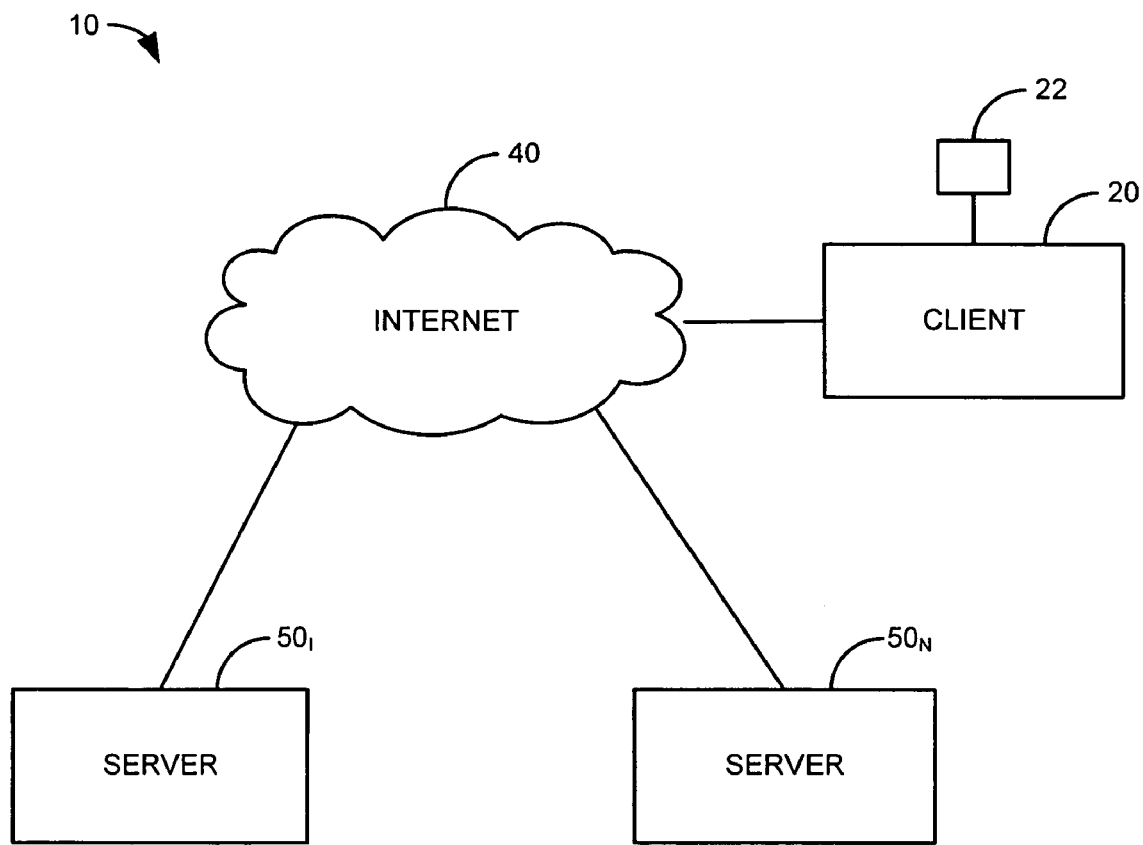
FIG. 1 is a simplified high-level block diagram of an information retrieval and communication system according to an embodiment of the present invention.

FIG. 1 illustrates a general overview of an information retrieval and communication network 10 including a client system 20 according to an embodiment of the present invention. In computer network 10, client system 20 is coupled through the Internet 40, or other communication network, e.g., over any local area network (LAN) or wide area network (WAN) connection, to any number of server systems $50_1$ to $50_N$. As will be described herein, client system 20 is configured according to the present invention to communicate with any of server systems $50_1$ to $50_N$, e.g., to access, receive, retrieve and display media content and other information such as web pages.

Several elements in the system shown in FIG. 1 include conventional, well-known elements that need not be explained in detail here. For example, client system 20 could include a desktop personal computer, workstation, laptop, personal digital assistant (PDA), cell phone, or any WAP-enabled device or any other computing device capable of interfacing directly or indirectly to the Internet. Client system 20 typically runs a browsing program, such as Microsoft's Internet Explorer™ browser, Netscape Navigator™ browser, Mozilla™ browser, Opera™ browser, or a WAP-enabled browser in the case of a cell phone, PDA or other wireless device, or the like, allowing a user of client system 20 to access, process and view information and pages available to it from server systems $50_1$ to $50_N$ over Internet 40. Client system 20 also typically includes one or more user interface devices 22, such as a keyboard, a mouse, touch screen, pen or the like, for interacting with a graphical user interface (GUI) provided by the browser on a display (e.g., monitor screen, LCD display, etc.), in conjunction with pages, forms and other information provided by server systems $50_1$ to $50_N$ or other servers. The present invention is suitable for use with the Internet, which refers to a specific global internetwork of networks. However, it should be understood that other networks can be used instead of or in addition to the Internet, such as an intranet, an extranet, a virtual private network (VPN), a non-TCP/IP based network, any LAN or WAN or the like.

According to one embodiment, client system 20 and all of its components are operator configurable using an application including computer code run using a central processing unit such as an Intel Pentium™ processor, AMD Athlon™ processor, or the like or multiple processors. Computer code for operating and configuring client system 20 to communicate, process and display data and media content as described herein is preferably downloaded and stored on a hard disk, but the entire program code, or portions thereof, may also be stored in any other volatile or non-volatile memory medium or device as is well known, such as a ROM or RAM, or provided on any media capable of storing program code, such as a compact disk (CD) medium, a digital versatile disk (DVD) medium, a floppy disk, and the like. Additionally, the entire program code, or portions thereof, may be transmitted and downloaded from a software source, e.g., from one of server systems $50_1$ to $50_N$ to client system 20 over the Internet, or transmitted over any other network connection (e.g., extranet, VPN, LAN, or other conventional networks) using any communication medium and protocols (e.g., TCP/IP, HTTP, HTTPS, Ethernet, or other conventional media and protocols).

It should be appreciated that computer code for implementing aspects of the present invention can be C, C++, HTML, XML, Java, JavaScript, etc. code, or any other suitable scripting language (e.g., VBScript), or any other suitable programming language that can be executed on client system 20 or compiled to execute on client system 20. In some embodiments, no code is downloaded to client system 20, and needed code is executed by a server, or code already present at client system 20 is executed.

B. Search System

Figure 2:
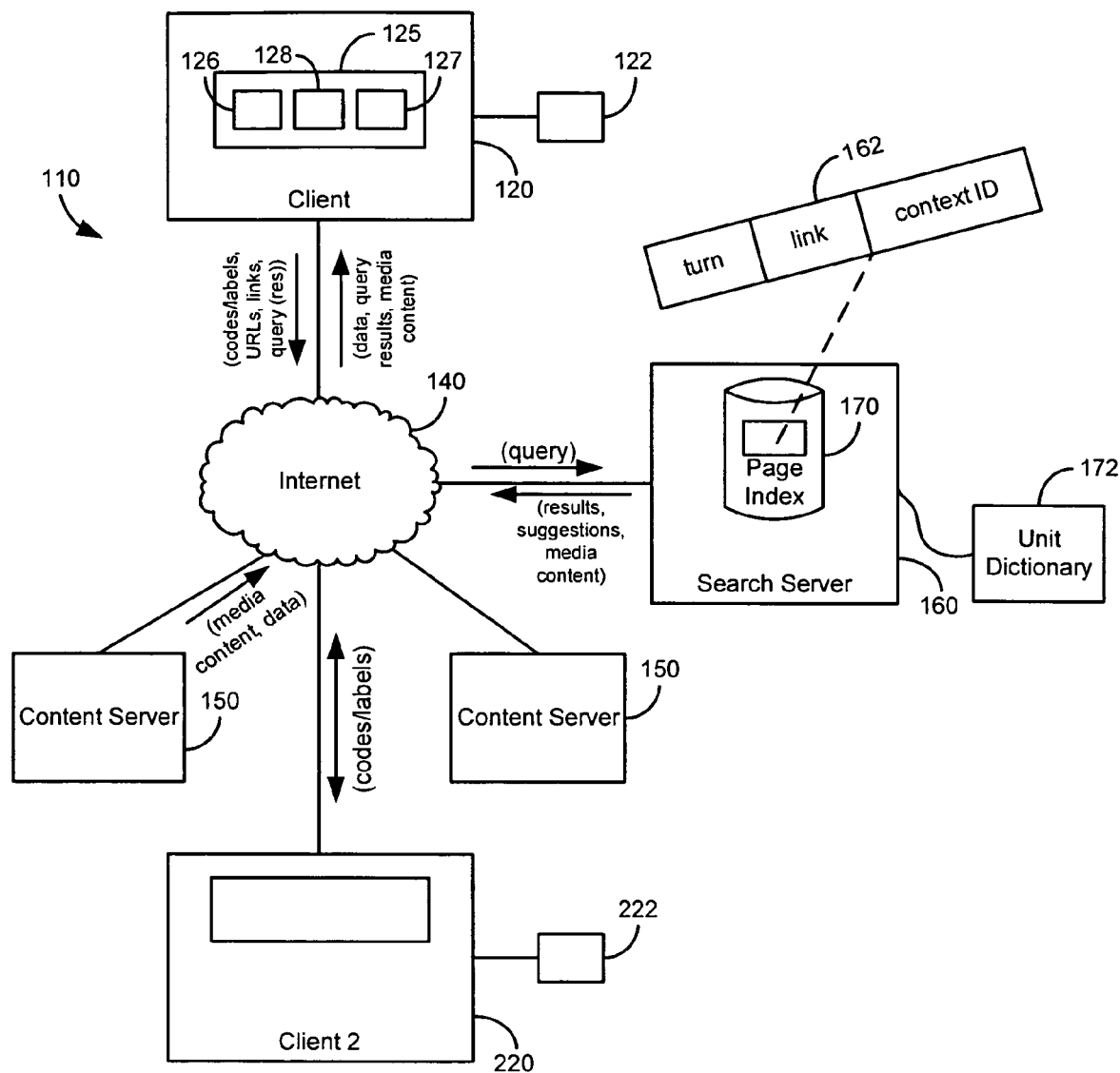
FIG. 2 is a simplified block diagram of an information retrieval and communication network for communicating media content according to an embodiment of the present invention.

FIG. 2 illustrates another information retrieval and communication network 110 for communicating media content according to an embodiment of the invention. As shown, network 110 includes client system 120, one or more content server systems 150, and a search server system 160. In network 110, client system 120 is communicably coupled through Internet 140 or other communication network to server systems 150 and 160. As discussed above, client system 120 and its components are configured to communicate with server systems 150 and 160 and other server systems over the Internet 140 or other communication networks.

1. Client System

According to one embodiment, a client application (represented as module 125) executing on client system 120 includes instructions for controlling client system 120 and its components to communicate with server systems 150 and 160 and to process and display data content received therefrom. Client application 125 is preferably transmitted and downloaded to client system 120 from a software source such as a remote server system (e.g., server systems 150, server system 160 or other remote server system), although client application module 125 can be provided on any software storage medium such as a floppy disk, CD, DVD, etc., as discussed above. For example, in one aspect, client application module 125 may be provided over the Internet 140 to client system 120 in an HTML wrapper including various controls such as, for example, embedded JavaScript or Active X controls, for manipulating data and rendering data in various objects, frames and windows.

Additionally, client application module 125 includes various software modules for processing data and media content, such as a specialized search module 126 for processing search requests and search result data, a user interface module 127 for rendering data and media content in text and data frames and active windows, e.g., browser windows and dialog boxes, and an application interface module 128 for interfacing and communicating with various applications executing on client 120. Examples of various applications executing on client system 120 for which application interface module 128 is preferably configured to interface with according to aspects of the present invention include various e-mail applications, instant messaging (IM) applications, browser applications, document management applications and others. Further, interface module 127 may include a browser, such as a default browser configured on client system 120 or a different browser. In some embodiments, client application module 125 provides features of a universal search interface as described in the above-referenced Provisional Application No. 60/460,222.

2. Search Server System

According to one embodiment, search server system 160 is configured to provide search result data and media content to client system 120, and content server system 150 is configured to provide data and media content such as web pages to client system 120, for example, in response to links selected in search result pages provided by search server system 160. In some variations, search server system 160 returns content as well as, or instead of, links and/or other references to content. Search server system 160 is also preferably configured to record user query activity in the form of query log files described below.

Search server system 160 in one embodiment references various page indexes 170 that are populated with, e.g., pages, links to pages, data representing the content of indexed pages, etc. Page indexes may be generated by various collection technologies including automatic web crawlers, spiders, etc., as well as manual or semi-automatic classification algorithms and interfaces for classifying and ranking web pages within a hierarchical structure. These technologies may be implemented on search server system 160 or in a separate system (not shown) that generates a page index 170 and makes it available to search server system 160.

An entry 162 in page index 170 includes a search term, a link (or other encoded identifier) to a page in which that term appears and a context identifier for the page. The context identifier may be used for grouping similar results for search terms that may have different meanings in different contexts. For example, the search term "java" may refer to the Java computer language, to the Indonesian island of Java, or to coffee (which is often colloquially referred to as java). The context identifier for a page advantageously indicates which of these contexts is applicable. A page link may be associated with multiple context identifiers, so the same page (or a link thereto) may be displayed in multiple contexts. Context identifiers are preferably automatically associated with page links by the system as users perform related searches; however, the identifiers may also be modified and associated with links manually by a team of one or more index editors. In this manner, knowledge gleaned from numerous searches can be fed back into the system to define and re-define contexts to make the displayed search results more valuable and useful to the requesting user.

Search server system 160 is configured to provide data responsive to various search requests received from a client system, in particular from search module 126. For example, search server system 160 may be configured with search related algorithms for processing and ranking web pages relative to a given query (e.g., based on a combination of logical relevance, as measured by patterns of occurrence of the search terms in the query; context identifiers; page sponsorship; etc.). In accordance with embodiments of the present invention, these algorithms include algorithms for concept analysis.

For instance, some embodiments of the present invention analyze search queries and/or results and groups results in contexts for display at the user's computer 120. For example, in response to the search term "Java", some embodiments of search server system 160 return search results grouped into three (or more if other contexts are identified) contexts or word senses: Java the computer language, Java the island, and coffee java. The system may be configured to display the results in sets with links provided in association with each context, or the system may display just the contexts (with enough information to distinguish the contexts to the user) without any links and allow the user to select the desired context to display the associated links. In the Yahoo! network system, for example, a set of contexts might be displayed with each context having a set of links to pages from the search index, links associated with sponsored matches, links associated with directory matches and links associated with Inside Yahoo! (IY) matches.

In addition to words or phrases having ambiguous meanings, such as "Java", some embodiments of the present invention are configured to group results into contexts for search terms that are not necessarily ambiguous. One example is the results returned for the search term "Hawaii". The term "Hawaii" in and of itself might not be ambiguous; however, the character of the results returned for such a term could be very broad, related to every site that discusses or just mentions Hawaii. To provide more useful results to the user, the system of the present invention preferably organizes search results into contexts by leveraging the knowledge of what the results are actually related to. For example, for Hawaii, the system may return results in various context groupings such as "Hawaii: travel", Hawaii: climate", "Hawaii: geography", "Hawaii: culture", etc. Such context identifiers ("travel," "climate," etc.) may be stored in page index entry 162 as described above.

It will be appreciated that the search system described herein is illustrative and that variations and modifications are possible. The content server and search server system may be part of a single organization, e.g., a distributed server system such as that provided to users by Yahoo! Inc., or they may be part of disparate organizations. Each server system generally includes at least one server and an associated database system, and may include multiple servers and associated database systems, and although shown as a single block, may be geographically distributed. For example, all servers of a search server system may be located in close proximity to one another (e.g., in a server farm located in a single building or campus), or they may be distributed at locations remote from one another (e.g., one or more servers located in city A and one or more servers located in city B). Thus, as used herein, a "server system" typically includes one or more logically and/or physically connected servers distributed locally or across one or more geographic locations; the terms "server" and "server system" are used interchangeably.

The search server system may be configured with one or more page indexes and algorithms for accessing the page index(es) and providing search results to users in response to search queries received from client systems. The search server system might generate the page indexes itself, receive page indexes from another source (e.g., a separate server system), or receive page indexes from another source and perform further processing thereof (e.g., addition or updating of the context identifiers).

C. Concept Networks and Superunits

In one embodiment, algorithms on search server system 160 perform concept analysis of search terms to provide more relevant results to the user. For example, for the search phrase "New York City" it is most likely that the user is interested in sites related to New York City (the city or region) as opposed to any other city in the state of New York. Similarly, for "New York City law enforcement" it is most likely that the user is interested in sites related to law enforcement (e.g., segment of jobs) in New York City. However, most conventional search engines would simply search using the individual terms "New", "York", "City", "law" and "enforcement" regardless of the order in which the terms appear in the search phrase. Other conventional search engines might try to find the longest substring in the search phrase that also appears in an index. For example, if the index contained "New York", "New York City" and "New York City law" but not "New York City law enforcement", the search engine would search using "New York City law" and "enforcement", which is not necessarily what the user intended and is unlikely to produce optimal results.

Search server system 160 is advantageously configured to detect, in a query such as "New York City law enforcement" the concepts "New York City" and "law enforcement" and to return results for these two concepts. In some embodiments, search server 160 uses the order that search terms are presented in a query to identify its constituent concepts. For example, using "New York City law enforcement" as the search phrase, the system identifies, e.g., by hashing, "New York City" and "law enforcement" as two concepts in the search phrase and returns results for these concepts. The same results would be returned for "law enforcement in New York City." However, for "city law enforcement in New York," different results would be returned based on the concepts "law enforcement" and "New York" and "city," or "city law enforcement" and "New York." Likewise, "enforcement of law in New York City" would be identified as including the concepts "New York City," "law" and "enforcement." Thus, the order of concepts is not so important as the order of terms that make up a concept. In some embodiments, concepts are included in the page index (e.g., as terms and/or context identifiers) or a separate concept index may be implemented. It should be noted that "law enforcement" could be regarded as the same as "enforcement of law" or not depending on the context. In some embodiments, the concepts within a query are advantageously detected by reference to a unit dictionary 172 that contains a list of known concepts (or "units").

Unit dictionary 172 is advantageously generated by a concept discovery process based on some number (preferably a large number, e.g., at least several hundred thousand) of previous queries. Concept discovery, examples of which are described below, involves analysis of the queries to generate a concept network and may be performed by search server 160 or by another server (not shown).

Figure 3:
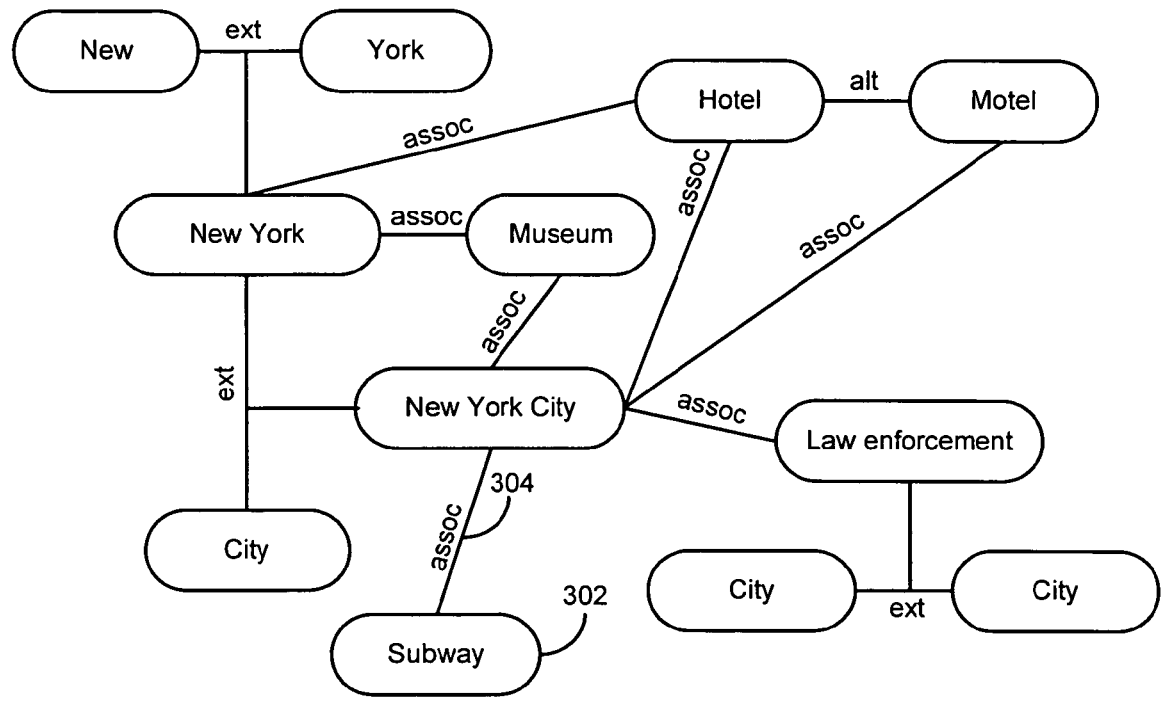
FIG. 3 is a graphical representation of a concept network according to an embodiment of the present invention.

As used herein, the term "concept network" encompasses any representation of relationships among concepts. For example, FIG. 3 is a graphical representation of a concept network 300 for a small number of concepts. Each concept or unit (e.g., "New", "York", "New York City", etc.) is a "node" (e.g., node 302) of the network and is connected to other nodes by "edges" (e.g., edge 304) that represent various relationships between concepts. A concept network can capture a variety of relationships. In the embodiment shown in FIG. 3, the relationships include extensions ("ext"), associations ("assoc"), and alternatives ("alt"); other relationships may also be captured in addition to or instead of those described herein.

An "extension" as used herein is a relationship between two units that exists when the string obtained by concatenating the two units is also a unit. For example, the string obtained by concatenating units "new york" and "city" is "new york city," which is also a unit. The extension relationship is shown in FIG. 3 as a "T" junction, with the crossbar connecting the two units that are related by extension (e.g., "new york" and "city") and the stem connecting to the extension unit (e.g., "new york city").

An "association" as used herein is a relationship that exists between two units that appear in queries together. For example, FIG. 3 shows that unit "hotels" is an association of units "new york" and "new york city". Pairs of associated units are also referred to herein as "neighbors," and the "neighborhood" of a unit is the set of its neighbors. To establish an association between units, a minimum frequency of co-occurrence may be required. It should be noted that the units that are related by association need not appear adjacent to each other in queries and that the string obtained by concatenating associated units need not be a unit. (If it is, then an extension relationship would exist. Thus, an extension relationship may be regarded as a special kind of an association.)

An "alternative" of a first unit is a different form (which may be a preferred, corrected, or other variant form) of the same expression; for example, FIG. 3 shows that "motel" and "hotel" are alternatives. Other examples of alternatives include "brittany spears" and "britney spears" (different spellings), or "belgian" and "belgium" (different parts of speech). Among a set of alternative units, one may be designated as "preferred," e.g., based on frequency of occurrence; for example, "britney spears" (the correct spelling of the name of the popular singer) might be a preferred alternative to misspelled alternatives such as "brittany spears." Embodiments described herein are case insensitive, and terms that differ only in capitalization (e.g., "Belgium" and "belgium") refer to the same unit; other embodiments may distinguish units based on case and may identify units that differ only in capitalization as alternatives.

In some embodiments, the edges in the concept network may be assigned weights (not shown in FIG. 3), i.e., numerical values that represent the relative strength of different relationships. For example, the edge weight between a first unit and an associated unit may be based on the fraction of all queries containing the first unit that also contain the associated unit, or on the fraction of all queries containing either unit that also contain the other. Weights advantageously reflect relative strength; accordingly, weights may be normalized in any manner desired. It is to be understood that FIG. 3 is illustrative and that other relationships, as well as other representations of connections or relationships between different units or concepts might also be used; the term "concept network" as used herein encompasses alternative representations.

In embodiments of the present invention, the relationships represented in the concept network also include membership of various units in "superunits." The term "superunit" as used herein refers to a set of units that have an identified common characteristic. The identified common characteristic (which may include multiple elements) is represented by a "signature" of the superunit that may be used to determine whether another unit belongs in the superunit. In some embodiments, the signature is also used to determine a "membership weight" for each member unit based on a degree of similarity between the unit's characteristics and the signature characteristic(s). A threshold membership weight may be defined, and the superunit may include only units whose membership weight exceeds this threshold.

For example, one superunit may be made up of cities (e.g., "New York City", "San Francisco", "Chicago", etc.), and its signature may include some number of other units that frequently appear in queries in association with the name of a city (e.g., "hotel", "museum", "mayor", "jobs", etc.). A new unit can be evaluated to determine whether it is a city (i.e., a member of the superunit) by comparing its associations to the signature. As another example, another superunit may be made up of units that are alternatives for each other (e.g., "britney spears", "brittany spears", "britney speers", etc.), and its signature might include units associated with the singer's name (e.g., "photos", "mp3", "tour", etc.) as well as an "edit distance" parameter indicating similarity in spelling. A unit that has similar associations but a large edit distance (e.g., "barbra streisand" or "celine dion") would be excluded, while other misspellings of Britney Spears would be included. Specific techniques for generating superunits and signatures from queries are described below. Like other relationships of units, superunit signatures and superunit membership information (e.g., membership weights) for various units may be stored in unit dictionary 172.

In some embodiments, different elements of a superunit's signature may be assigned different weights. The weights are advantageously selected to reflect the relative effectiveness of different signature elements in characterizing the superunit.

Search server 160 advantageously uses superunit information in responding to queries, e.g., by determining which superunits the units in a query belong to and comparing the units of the query to the signatures of these superunits to determine what the user most likely intended. Search server 160 can use this information about likely user intent, e.g., to organize the search results, suggest related searches, etc. These features of search server 160 are described in Sec. III below.

II. Concept Analysis System

Figure 4:
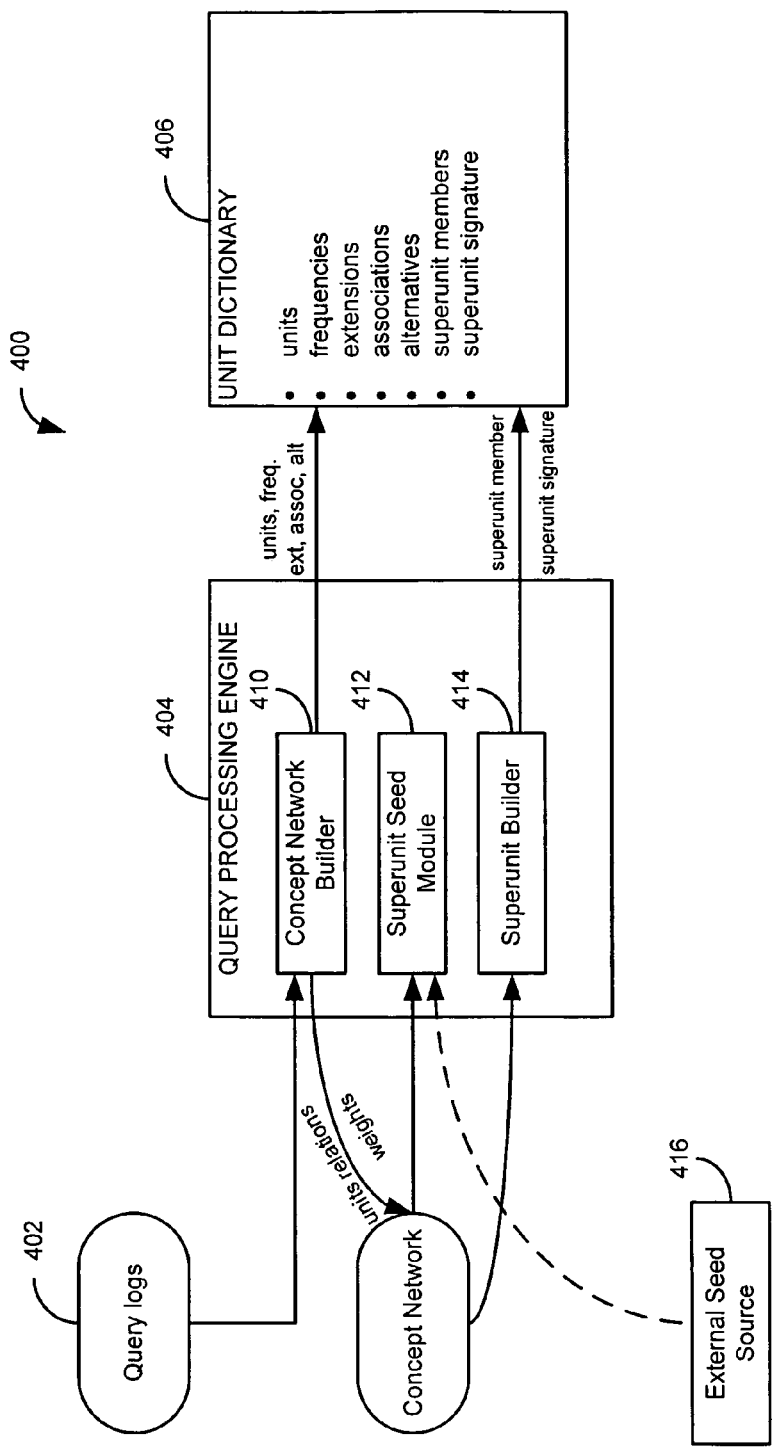
FIG. 4 is a simplified block diagram of a query processing engine according to an embodiment of the present invention.

FIG. 4 is a block diagram of a system 400 for performing concept discovery or concept analysis, including superunit generation, according to one embodiment of the present invention. One or more query log files 402 (or actual queries) are received by a query processing engine (also referred to as a query engine) 404, which generates a unit dictionary 406. Query engine 404 may be a component of search server system 160 (FIG. 2) or a different system that communicates with search server system 160. In one embodiment, query engine 404 includes a concept network (CN) builder 410, a superunit seed module 412, and a superunit builder 414. CN builder 410 analyzes the content of query log file 402 and generates a concept network 408 that includes units, relationships between units (e.g., extensions, associations, and alternatives), and edge weights for the relationships. Superunit seed module 412 generates preliminary groupings of units into superunits (referred to herein as "seeds"), optionally by analysis of concept network 408. Superunit builder 414 processes concept network 408 using the seeds provided by superunit seed module 412 to generate a number of superunits. The units and their relationships, including superunits, are captured in a unit dictionary 406.

Unit dictionary 406 may be implemented in any format and stored on any suitable storage media, including magnetic disk or tape, optical storage media such as compact disk (CD), and so on. The content of unit dictionary 406 advantageously includes the units, as well as additional information about each unit, such as relationships (e.g., extensions, associations, alternatives) and statistical data (e.g., edge weights) generated by CN builder 410 and superunit membership (e.g., membership weights) as determined by superunit builder 414. Unit dictionary 406 may also include information related to the superunits themselves, such as parameters of a signature associated with a superunit. Information stored in unit dictionary 406 can be used by a search server (e.g., search server 160 of FIG. 2) to respond to subsequent queries.

A query log file 402 (or an actual query) may be received from various sources over the Internet or through various network connections, e.g., LAN, WAN, direct links, distribution media (e.g., CD, DVD, floppy disk), etc. Examples of sources include search server system 160 (FIG. 2), or multiple search servers 160 in a distributed network of search servers, and one or more of content servers 150. Query log file sources are typically associated with the same organization or entity, e.g., Yahoo! servers, but need not be. The query log files (also referred to as query logs) are processed by query engine 404 using statistical methods such as may be used in information theory or concepts such as mutual information. In some embodiments, daily query logs are used, although logs for different time periods, e.g., hours, weeks, etc. may be used as desired. Query logs typically include actual queries (e.g., text strings) submitted by users and may also include additional information (referred to herein as "meta-information") for some or all of the queries, such as geographic location of querying users, timestamps, IP addresses of client systems, cookies, type of client (e.g., browser type), etc. For example, query log entries might be formatted as <query_string, meta-information> or as <count, query_string> where "count" represents frequency of occurrence. (Frequency may be normalized or not as desired.)

A. Concept Network Builder

CN builder 410 processes the query logs 402 to generate concept network 408. In preferred embodiments, CN builder 410 uses the order of search terms within a query to identify one or more units that make up that query. For example, a unit may be a word (e.g., "java") or a group of words that frequently appear adjacent to each other (e.g., "new york city"). The units correspond to nodes (concepts) in the concept network.

CN builder 410 also analyzes the units to detect relationships such as extensions (which may be detected based on one word or unit sometimes being followed by another word or unit and sometimes not), associations (which may be detected based on frequency of occurrence of pairs of units), and alternatives (which may be detected based on "edit distance," i.e., the number of typographical changes required to transform one unit into another). Particular techniques for identification of units and relationships between units (including associations, extensions, and alternatives) are described in detail in above-referenced application Ser. No. 10/713,576. It will be appreciated that CN builder 410 may also implement other techniques in addition to or instead of those described therein, in order to generate concept network 408.

A representation of concept network 408 may be stored in unit dictionary 406. In some embodiments, this representation includes the units together with sets of relationships and weights for each unit. Various data compression techniques may be used for representing this information in unit dictionary 406.

B. Superunit Seed Module

Superunit seed module 412 generates one or more seeds from which superunits can be constructed. As used herein, a "seed" may be a single unit or a list of units that has one or more common traits. Superunit seed module 412 can use a variety of techniques for generating seeds. Four examples of such techniques will now be described: (1) analysis of concept network 408; (2) reference to external sources; (3) analysis of user behavior; and (4) analysis of documents in the search corpus. It is also to be understood that a single unit can be used as a seed, and superunit seed module 412 might simply select some number units from concept network 408 to be used as seeds (e.g., based on frequency of occurrence, size of neighborhood, or some other criterion).

1. Seeds Based on Concept Network (Clusters and Cliques)

In one embodiment, superunit seed module 412 performs further analysis of the queries using concept network 408, to create clusters (i.e., groups of related units) that can be used as seeds. In this embodiment, clusters are generated from units by identifying different units ("members" of the cluster) that have similar neighborhoods (i.e., sets of associated units). The clusters can be used as seeds for superunit generation; as will be seen, the clusters themselves may also be superunits.

For example, consider a case where users search for information about their favorite musical performers. Typically, these users would construct a query that includes the name of the performer (e.g., "Avril Lavigne" or "Celine Dion" or "Matchbox Twenty") and also some other words reflecting the type of information sought, such as "lyrics", "mp3", "guitar tabs", "discography", and so on; these other words are neighbor units that would tend to appear with names of different performers. Based on the occurrence of similar neighbor units, superunit seed module 412 groups the performer names into a cluster.

Figure 5:
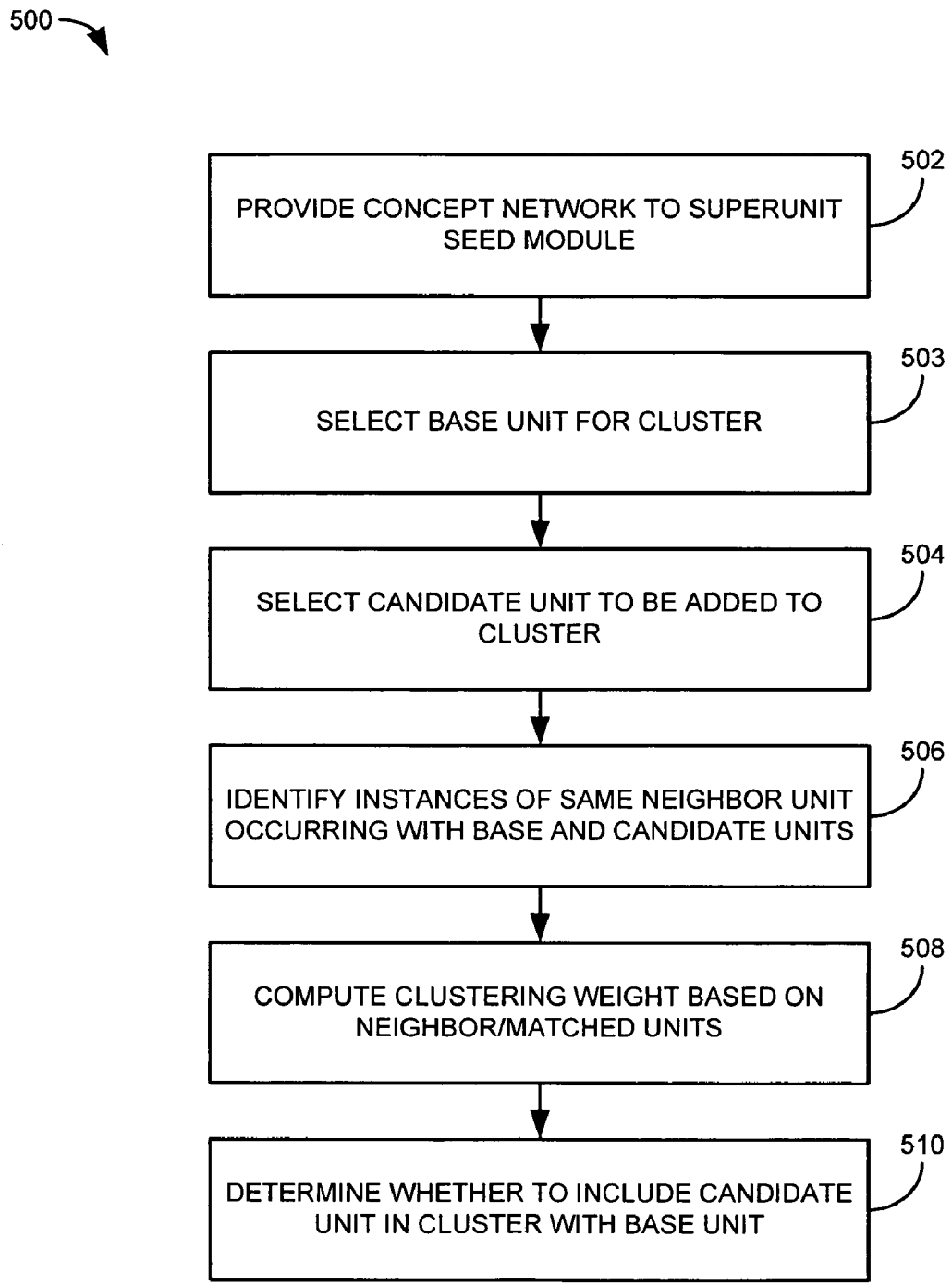
FIG. 5 is a flow diagram of a process for generating clusters usable as superunit seeds according to an embodiment of the present invention.

More specifically, FIG. 5 is a flow diagram of a process 500 that can be performed by superunit seed module 412 to generate clusters from a concept network 408. At step 502, the concept network 408 is provided to superunit seed module 412.

At step 503, a base unit for forming a cluster is selected. In some embodiments, every unit in the concept network may be used as a base unit. In other embodiments, base units may be limited, e.g., to units occurring with at least some minimum frequency. It is to be understood that any number of clusters can be created by repeating process 500 using different base units.

At step 504, another unit in concept network 408 is selected as a candidate unit for inclusion in a cluster with the base unit. An iterative procedure may be used to select all pairs of units, or selection may be restricted to units that meet certain criteria. For example, in one embodiment concept network 408 includes associations of a particular unit and various neighbor units. In this embodiment, step 504 includes comparing the neighborhoods of the base unit and a second unit to determine the degree of overlap; if it is too small, the second unit does not become a candidate unit. In this embodiment, selection of units to consider is simplified by starting with a base unit B, finding a neighbor unit A, then finding a third unit C that is also a neighbor of A. Comparing the neighborhoods of units B and C determines whether unit C is selected as a candidate unit for inclusion in a cluster with unit B. This procedure reduces the set of possible candidate units to those units that have at least one neighbor in common with the base unit.

At step 506, instances of neighbor units that occurs with both the base unit and the candidate unit are identified. E.g., if "Avril Lavigne" and "matchbox twenty" are the base unit and candidate unit, neighbor units in common might include "lyrics", "discography", and so on. Neighbor units that occur with the base and candidate units are referred to herein as "matched" units.

At step 508, a clustering weight for the candidate unit is computed based on the neighbor units, including the matched units. This clustering weight is a measure of similarity between the candidate units and the base unit; it may be calculated in various ways. Five examples of suitable algorithms for computing clustering weights will now be described; those of ordinary skill in the art will recognize that other algorithms may also be used.

EXAMPLE 1

One algorithm takes into consideration the number of matched units as a measure of similarity. The clustering weight for units $u_1$ and $u_2$ is defined as:

$$W(u_1, u_2) = N_C/N_T, \tag{1}$$

where $N_C$ is the number of matched units and $N_T$ is the larger of the total number of neighbor units for unit $u_1$ and the total number of neighbor units for unit $u_2$.

Variations are possible. For example, $N_T$ might be defined as the smaller of the two totals (instead of the larger), or as the average of the two totals.

EXAMPLE 2

A second algorithm takes into account the frequencies (and thus how important a neighbor unit is for a unit) for every matched unit. The clustering weight for units $u_1$ and $u_2$ is defined as:

$$W(u_1, u_2) = F_M/F_T, \tag{2}$$

where $F_M$ is the sum, over all matched units $s_i$, of the frequency with which unit $s_i$ occurs with unit $u_1$ and the frequency with which unit $s_i$ occurs with unit $u_2$; and $F_T$ is the sum of the same frequencies over all neighbor units, matched or not.

EXAMPLE 3

Relative frequency is an alternative measure of importance in which a penalty (decrease in weight) is attached in cases where the relative frequencies of occurrence of the matched unit with units $u_1$ and $u_2$ are different. In this example, R1$i$ and R2$i$ are defined as the relative frequencies of neighbor unit $s_i$ with units $u_1$ and $u_2$ respectively. The clustering weight is given by:

$$W(u_1, u_2) = \sum_{s_i} \frac{1}{1 - R1i} * (1 - P * |R1i - R2i|), \tag{3}$$

where the sum is taken over matched units $s_i$, and P is a penalty factor that weights the difference in relative frequencies. The value of P may be varied; in one embodiment, P=2.

EXAMPLE 4

Comparing neighbor units in descending order of frequencies (rank) is another way to measure importance. Similarly to Example 3, a penalty is attached to any difference of the ranks of the matched units. Each matched unit $s_i$ is assigned two ranks Q1$i$ and Q2$i$, denoting its rank with units $u_1$ and $u_2$ respectively. The clustering weight is given by:

$$W(u_1, u_2) = \sum_{s_i} [M - |Q1i - Q2i|], \tag{4}$$

where M is the lesser of the total number of neighbor units for unit $u_1$ and the total number of neighbor units for unit $u_2$, and the sum is taken over matched units $s_i$.

EXAMPLE 5

Unlike the preceding algorithms, this algorithm takes the discriminatory power of a neighbor unit into consideration. "Relevance" for any unit u can be defined by comparing the frequency with which the unit appears together with one or more other units (which may be any units) in a query ($f_u$) to the frequency with which the unit appears alone in a query ($f_q$). In one measure, relevance is given by $\rho(u)=f_u/f_q$.

This measure of relevance can be combined with the notion of relative frequency discussed above to compute the clustering weight. A "score" $\sigma$ is given to each matched unit $s_i$, based on its relative frequency; specifically, $\sigma(s_i)=1-R1i-R2i$), where R1$i$ and R2$i$ are defined as in Example 3 above. The clustering weight is given by:

$$W(u_1, u_2) = \sum_{S_i} \sigma(s_i) * 1/(1 - C * \rho(s_i)). \tag{5}$$

The value of constant C may be optimized based on empirical analysis; in one embodiment, C=0.5.

Returning to FIG. 5, at step 510, a decision is made as to whether to include the candidate unit in a cluster with the base unit. For example, a unit may be excluded from a cluster if its clustering weight is too low.

In some embodiments, clustering may stop with pairs of units. In other embodiments, larger clusters are formed by selecting a different candidate unit and repeating steps 506, 508, and 510. In still other embodiments, clusters of two or more units may be used in place of the base unit to generate larger clusters. Where a cluster is used as a base unit, its neighborhood may be defined in various ways, e.g., as the union or intersection of neighborhoods of the member units, as the set of units that is a neighbor of at least some minimum fraction (e.g., 25%, 50%, 80%) of the member units, and so on. The clusters, regardless of size, may be used as superunit seeds.

In some embodiments, clusters may be further refined into "cliques" that have stronger or closer relationships between the member units. In one embodiment, a "clique" is a set of units where every member unit is present in the cluster formed from every other member unit. Cliques can be used for various purposes, e.g., distinguishing spelling errors and alternative word forms, or distinguishing different word senses of the base unit around which a cluster is formed. For example, a cluster whose base unit is "New York" may include units that are names of other cities (e.g., "Boston", "Seattle", etc.) and may also include units that are alternative names for the same city (e.g., "NY", "NYC"). From these units, a clique including different cities ("New York", "Boston", "Seattle") and a different clique including alternative names for "New York City" ("New York", "NYC", "NY") might be formed.

As another example, a cluster with base unit "Yahoo" may include names of other e-mail providers (e.g., "AOL", "Hotmail") as well as names of other search engines (e.g., "Google"). A cluster with base unit "Google" may include "Yahoo" but not "AOL" or "Hotmail." Thus, "Yahoo" and "Google" might be members of one clique while "Yahoo," "AOL" and "Hotmail" might be members of another clique.

Figure 6:
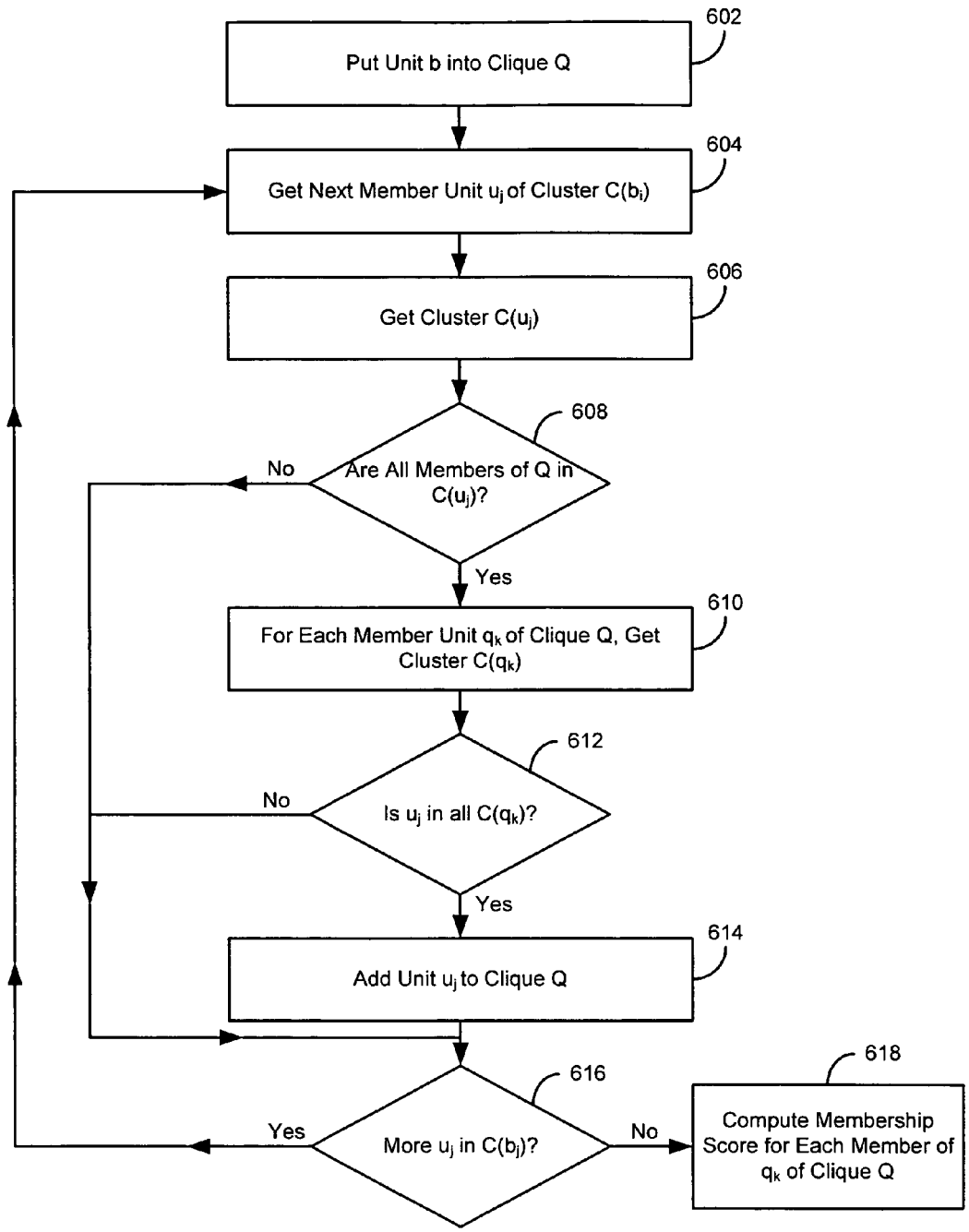
FIG. 6 is a flow diagram of a process for generating cliques usable as superunit seeds according to an embodiment of the present invention.

FIG. 6 is a flow diagram of a process 600 that may be used to form a clique Q having member units $q_k$ from a group of clusters according to an embodiment of the present invention. In these examples a number N of clusters has been formed, each having a different base unit $b_i$ ($1 \leq i \leq N$). The clusters are denoted herein as $C(b_i)$, and a unit u that is a member of cluster $C(b_i)$ has a clustering weight denoted by $W(u, b_i)$, which may be computed, e.g., using any of the formulas given above. (For a unit u that is not in cluster $C(b_i)$, weight $W(u, b_i)$ may be assigned a value of zero.) It is to be understood that a given unit may be a member of any number of clusters $C(b_i)$, and that in some instances a cluster $C(b_i)$ may consist of only the base unit $b_i$. In process 600 a clique $Q(b_i)$ having members $q_k$ is formed by starting with base unit $b_i$ as the first member of clique $Q(b_i)$ and finding other units $u_j$ of $C(b_i)$ for which: (1) all members $q_k$ of the clique Q are elements of cluster $C(u_j)$; and (2) unit $u_j$ is an element of the cluster $C(q_k)$ for each member $q_k$ of the clique Q.

More specifically, at step 602 the clique Q is created with one member, $b_i$. At step 604 the next member unit $u_j$ of the cluster $C(b_i)$ is obtained. At step 606, the cluster $C(u_j)$ is obtained. At step 608, it is determined whether all members of clique Q are also members of cluster $C(u_j)$. If not, then unit $u_j$ is not to be added to clique Q, and process 600 jumps to step 616. Otherwise, at step 610, for each member $q_k$ of clique Q, the cluster $C(q_k)$ is obtained. At step 612, it is determined whether unit $u_j$ is in each cluster $C(q_k)$ obtained at step 610. Steps 610 and 612 may be performed by iterating over members $q_k$ of clique Q, or clusters for multiple members $q_k$ may be tested in parallel. If unit $u_j$ is not in every cluster $C(q_k)$ obtained at step 610, then $u_j$ is not to be added to clique Q, and process 600 jumps to step 616. If unit $u_j$ is in every cluster $C(q_k)$, then unit $u_j$ is added to clique Q at step 614.

At step 616, regardless of whether unit $u_j$ was added to clique Q, it is determined whether or more units $u_j$ remain in cluster $C(b_i)$. If so, then process 600 returns to step 604 to process the next member unit $u_j$.

After all units $u_j$ have been processed, at step 618 a membership score for each member $q_k$ of clique Q is determined. In one embodiment, the score is computed by adding the clustering weights of unit $q_k$ in the clusters based on each other member unit of clique Q, i.e., $$\text{Score}(q_k) = \sum_{i \neq k} W(q_k, q_i), \quad (6)$$

where $W(q_k, q_i)$ denotes the clustering weight for unit $q_k$ as a member of cluster $C(q_i)$. Other formulas may also be used to assign a clique membership score. In some embodiments, clique members may be arranged in order of descending or ascending score.

It will be appreciated that the process described herein is illustrative and that variations and modifications are possible. Steps described as sequential may be executed in parallel, order of steps may be varied, and steps may be modified or combined. For example, the condition for adding a unit to a clique may be relaxed to require, e.g., that (at step 608) at least a fraction f1 of the members $q_k$ of the clique Q are elements of cluster $C(u_j)$ or that (at step 612) $u_j$ is an element of at least a fraction f2 of the clusters $C(q_k)$. The fractions f1 and/or f2 may be chosen as desired and may be, e.g., 50%, 70%, 90%, etc.; the two fractions may or may not be equal in various embodiments. Process 600 may be repeated with different base units $b_i$ to generate any number of cliques. Where cliques are generated, cliques may be used as superunit seeds instead of clusters, or a combination of cliques and clusters may be used as superunit seeds.

2. Seeds Based on External Sources

In another embodiment, superunit seed module 412 generates seeds by reference to one or more external sources (shown generally as block 416 in FIG. 4). Examples of external sources include a list of related terms created by an editor or editorial team (e.g., a list of popular singers or a list of auto manufacturers known to the team); an authoritative web site (e.g., a medical reference site that maintains a dictionary or other listing of diseases); or the like. In this embodiment, superunit seed module 412 may perform little or no processing on the external source data. For example, if a list of words is provided by an editorial team, superunit seed module 412 may simply forward the list to superunit builder 414. Superunit seed module 412 may also prune the list to remove any entries that are not units in concept network 408. It should be noted that such a superunit seed need not be an exhaustive list and may include a small number (e.g., two, five, or ten) of units.

3. Seeds Based on User Behavior

In a third embodiment, superunit seed module 412 generates seeds by analyzing user behavior. For example, a search server (e.g., server 160 of FIG. 2) may respond to a query by providing a search result page to client 120. The search result page includes a list of "hits" (links to web pages or sites that include content relevant to the query). The list of hits may include, e.g., page titles, excerpts showing the relevant content, and/or other information. The user reviews the list and selects a hit, e.g., by clicking on the displayed link. (This action is referred to as "click-through," although it is to be understood that links and clicking are not required.) Query logs 402 may provide click-through data for some or all queries indicating which link(s) a user followed from the search result page(s). Superunit seed module 412 may receive this data and identify instances where users who entered different queries clicked through to the same page. This user behavior suggests a commonality between the queries, and seed module 412 may group queries (or selected units thereof) having similar (or identical) click-through behavior into a seed. Seed module 412 is advantageously configured to group the queries (or units) only when a pattern of behavior suggesting relevance of the page is detected (e.g., when clickthrough to a particular page happens with a certain minimum frequency).

4. Seeds Based on Document Analysis

In a fourth embodiment, seed module 412 generates seeds by analysis of one or more "source" documents in the search corpus (e.g., web pages in the case of a web search embodiment). In this embodiment, seed module 412 infers commonality between units based on their appearing in the same document. For example, seed module 412 may parse a document into constituent units, e.g., by matching text strings to entries in unit dictionary 406 or to units (nodes) in concept network 408. In one embodiment, all the units that are found in the document are gathered into a single seed list.

In another embodiment, the units are filtered, e.g., by requiring a minimum frequency of occurrence, by including pairs (or larger groups) of units only if they occur in proximity to each other, or the like. The resulting list of units can be used as a superunit seed. Document analysis can be performed using any number of source documents, and various criteria may be used for automatically or manually selecting documents to analyze.

It is to be understood that the foregoing embodiments of seed module 412 are illustrative and not restrictive. Seeds may be generated using any one or more of the above or other techniques, or by a combination of techniques. In still other embodiments, each unit (or each of some subset of the units, e.g., the most frequent) may be used as a separate seed.

C. Superunit Builder

Regardless of how seeds are generated, seed module 412 provides the seeds to superunit builder 414, which uses the seeds and the concept network 408 generated by CN builder 410 to construct superunits. In some embodiments, superunits are constructed by an iterative process of identifying a signature (i.e., one or more relationships that the units in the seed tend to have in common), searching for additional units in the concept network that match the signature, adding those units to the superunit, and revising the signature to reflect the current content of the superunit.

Figure 7:
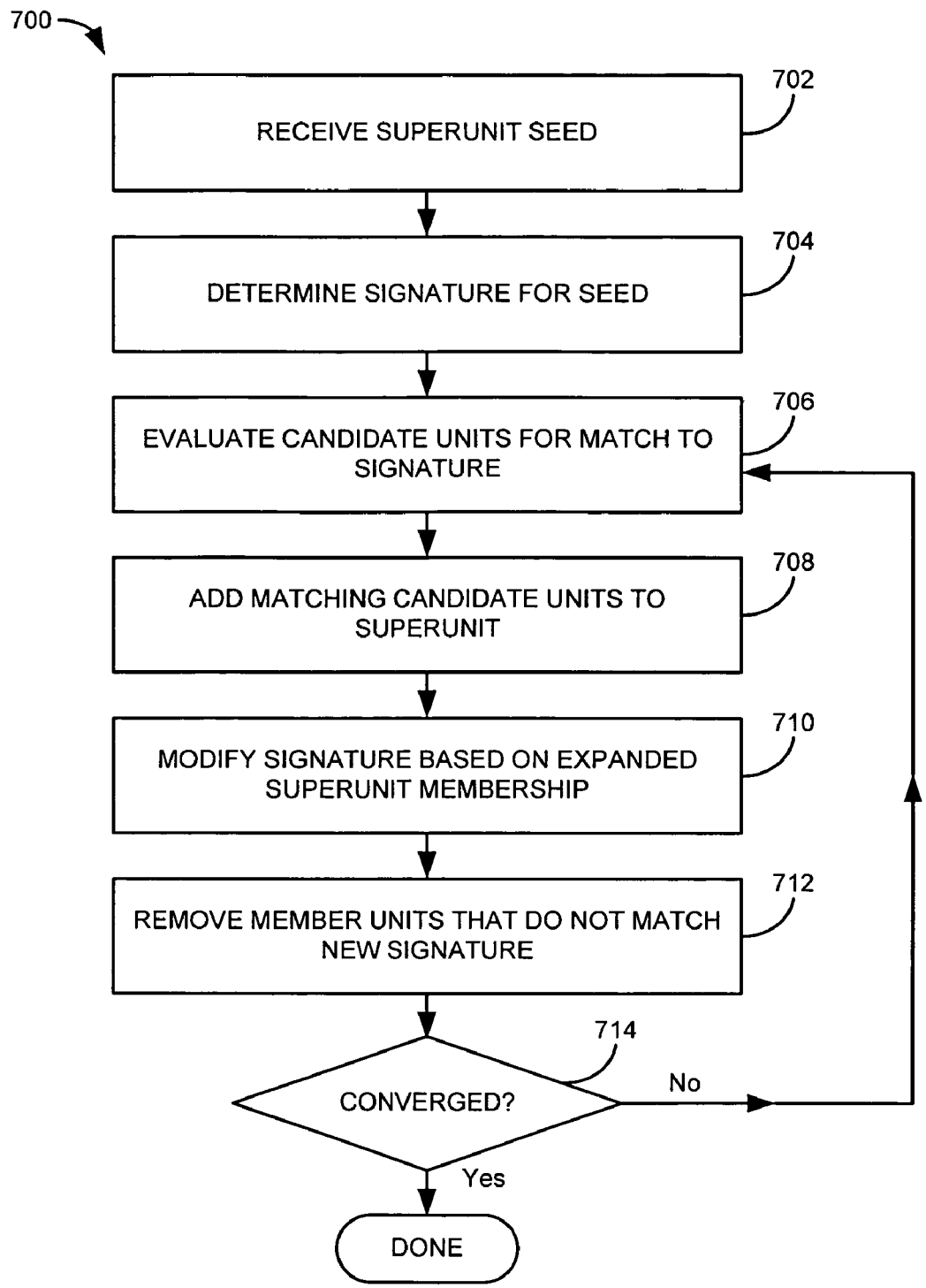
FIG. 7 is a flow diagram of a process for constructing superunits from seeds according to an embodiment of the present invention.

More specifically, FIG. 7 is a flow diagram of a process 700 for generating superunits that may be implemented in superunit builder 414 according to an embodiment of the present invention. At step 702, superunit builder 414 receives a seed from seed module 412. The seed is treated as an initial superunit.

At step 704, a signature for the (initial) superunit is determined. The signature is advantageously defined based on a set of units that is related to one or more member units of the superunit, where none of the signature units is a member of the superunit. For example, superunit builder 414 may locate member units of the superunit in concept network 408 and compare the neighbor units of each member unit to determine which neighbor units are common to the member units (and are not themselves member units). In one embodiment, signature units are advantageously selected based on two criteria: (1) likelihood that a member of the superunit is a neighbor of the signature unit; and (2) likelihood that a neighbor of the signature unit is a member of the superunit. These criteria identify signature units that tend to be effective discriminators between members and non-members of the superunit.

As examples of the first criterion, a signature unit may be required to have a specific relationship with at least 5% (or 10% or 50%) of the member units; or the relationship of a signature unit to some fraction of member units may be required to have a minimum edge weight; or the sum of edge weights between a signature unit and the member units may be required to exceed some threshold. In some embodiments, the signature units are associated with weight bounds that may reflect an average edge weight (or distribution of edge weights) for the relationship between the member units of the superunit and each signature unit.

As examples of the second criterion, a minimum fraction of the neighbor units of the signature unit may be required to be members of the superunit; or the edge weights for relationships between the signature unit and the member units versus the edge weights for relationships between the signature units and non-member units may be required to satisfy a specific relationship. Further examples of signature definition are described below.

At step 706, candidate units—i.e., units that are not in the superunit or the signature—are evaluated to determine whether they match the signature. A candidate unit matches the signature when its relationships to the signature units meet pre-established criteria. For instance, the candidate unit may be given a membership score reflecting how closely its relationships match the signature. The score may be computed in various ways, and a minimum score may be imposed as a "match" criterion. In one embodiment, the membership score is based on the fraction of signature units that are related to the candidate unit, with a minimum score of 50% (or 40% or 90%, etc.). In other embodiments, where signature units are associated with weight bounds, the candidate might be evaluated based on the fraction of signature units for which the edge weights of the candidate's relationships are within the weight bounds. In still other embodiments, any of the algorithms described above or other suitable algorithms for determining similarity of two units during a clustering process (FIG. 5) may be adapted for determining a membership score for a candidate unit, using the superunit as the other candidate unit and the signature units as the neighbor units for the superunit.

Selection of candidate units to be evaluated may be simplified, e.g., by considering only units that are directly related to one or more of the signature units. As noted above, units that are already members of the superunit or the signature may be excluded from the list of candidates.

At step 708, any candidate units that match the signature (e.g., that have a membership score that exceeds some threshold) are added to the superunit. At step 710, a new signature is generated for the updated superunit. Step 710 advantageously uses the same signature generating technique as step 704, so that any difference between the new signature and the previous signature is due to changed membership in the superunit.

At step 712, the superunit is purged by removing any member units that do not match the new signature. Step 712 advantageously uses the same match criterion as step 706. In some embodiments, the seed units are tested and purged at step 712 as any other member units; in other embodiments, seed units are not purged. In still other embodiments, step 712 is omitted so that superunit membership can grow but not shrink.

At step 714, it is determined whether the superunit has converged; if not, then the process returns to step 706 to iterate the steps of updating the superunit based on the signature and then updating the signature. Convergence occurs when the membership of either the superunit or its signature (or both) has not changed during an iteration. Some embodiments may employ a relaxed condition for convergence, allowing convergence to be found when a sufficiently small change in the superunit or signature occurs.

At step 716, once the superunit has converged, the new superunit is added to unit dictionary 406. For example, the superunit may be represented as a vector of member units and a vector of membership weights (where the membership weight for each member is its final membership score determined from the final signature). Alternatively, the superunit may be represented using a vector of membership weights for all units of unit dictionary 406. In this case, weights for units that are not members of the superunit may be set to zero, or a membership weight may be computed for non-member units based on the final signature. The final signature for the superunit is also advantageously stored in unit dictionary 406.

Figure 8A:
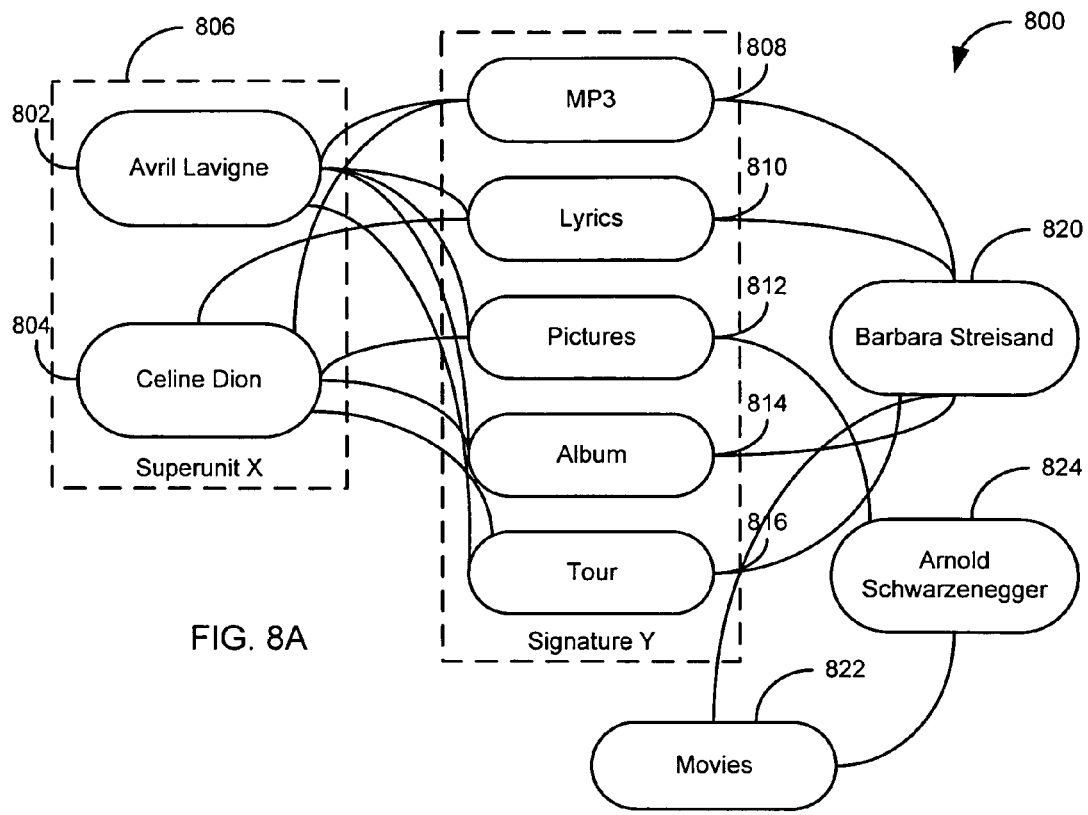
FIGS. 8A-B are graphical representations of a concept network at different stages in the superunit generation process illustrated in FIG. 7.
Figure 8B:
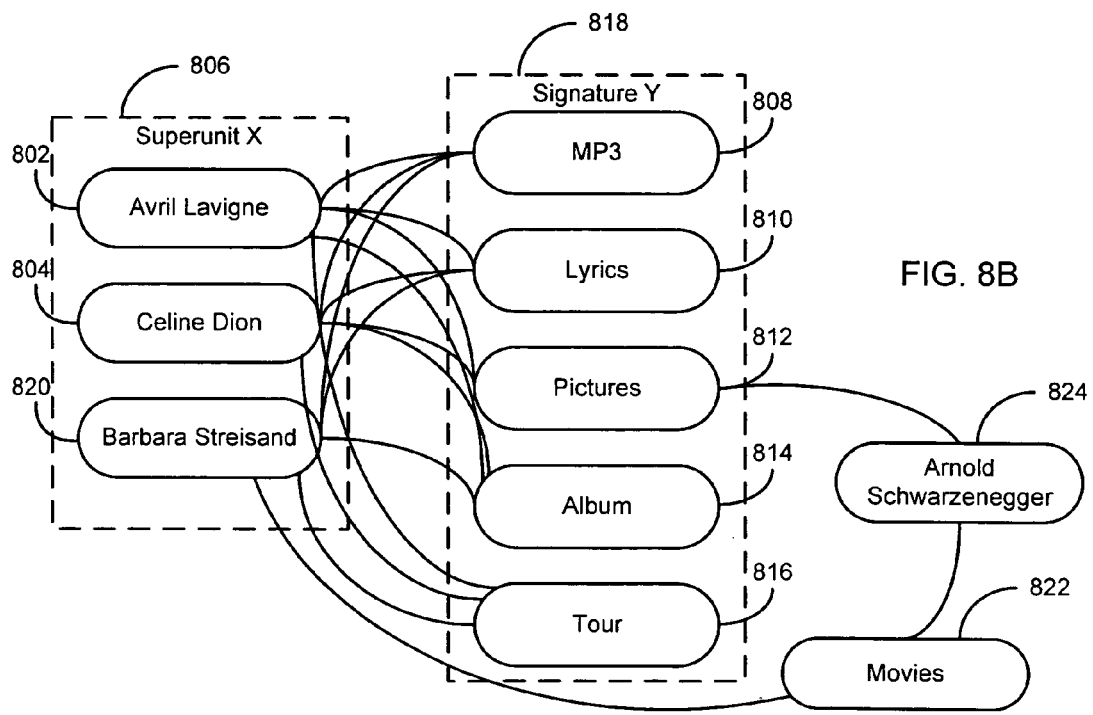

FIGS. 8A-B illustrate a portion of a concept network 800 during superunit construction in accordance with process 700. The notational conventions of FIGS. 8A-B are generally similar to those of FIG. 3, except that for network 800 only association relationships are shown and so the relationship edges are not labeled. (It should be understood that in other cases, relationships other than associations may also be considered.) FIG. 8A shows the state of concept network 800 after step 704. Nodes (units) "avril lavigne" 802 and "celine dion" 804 are members of a seed for a superunit "X" (dotted box 806). Nodes "mp3" 808, "lyrics" 810, "pictures" 812, "album" 814, and "tour" 816 have been identified (during step 704) as members of the signature "Y" (dotted box 818) of superunit X. Nodes "barbra streisand" 820, "movies" 822, and "arnold schwarzenegger" 824 are not members of either superunit X or signature Y.

In this example, superunit generation might proceed by identifying the units "barbra streisand" 820 and "arnold schwarzenegger" 824 as being candidate units because each is a neighbor of at least one unit of signature Y. Each candidate unit would then be evaluated for a match to the signature based on some criterion. For example, the candidate might be required to be associated with at least 75% of the signature units. The "barbra streisand" node 820 is associated with four of the five units in signature Y and would be added to superunit X at step 708. The "arnold schwarzenegger" node 824 is associated with only one of the units in signature Y and would not be added to superunit X at step 708. FIG. 8B shows the state of concept network 800 after steps 706 and 708, with the "barbra streisand" node 820 being added to superunit X' (dotted box 806').

Next, signature Y for superunit X' is updated (step 710). For example, signature Y may be defined to include only units that are associated with at least 50% of the members of superunit X. The "barbra streisand" unit 820 is associated with the "movies" unit 822, but the other members are not; therefore, "movies" is not added to signature Y. The "pictures" unit 812 is not associated with the "barbra streisand" member unit 820 but is associated with the other two of the three units; thus, "pictures" remains in the signature.

In this example, signature Y did not change during the iteration and convergence would be found because the membership scores of possible candidate units would not change. It is to be understood that this example is highly simplified; concept networks may be considerably larger and more complex than the portion shown in FIGS. 8A-B, and numerous iterations may be required for a superunit to converge.

Another example of superunit generation in accordance with process 700 will now be described for a superunit related to drugs. In this example, the concept network was generated from a large number of queries (e.g., a week's worth of queries received by a major Internet search provider such as Yahoo!). From the concept network, a clique was formed using the brand name of a specific medication (e.g., "Vicodin") as a base unit. The clique, which was formed in accordance with process 600 described above, included a small number (in this case, nine) of other units that were names of specific medications (e.g., "Oxycontin", "Propecia", etc.).

This clique was used as a superunit seed (step 702), for generating superunit set X. Each member unit $x_i$ of the superunit seed was assigned a membership weight $W(x_i)$ that was initialized to a constant value (e.g., $W(x_i)=1$ for all $x_i$), in other embodiments, the clustering weight (using, e.g., any of the clustering algorithms described above) or the clique membership score (e.g., from Equation (6) above) might be used as the initial membership weight.

Figure 9:
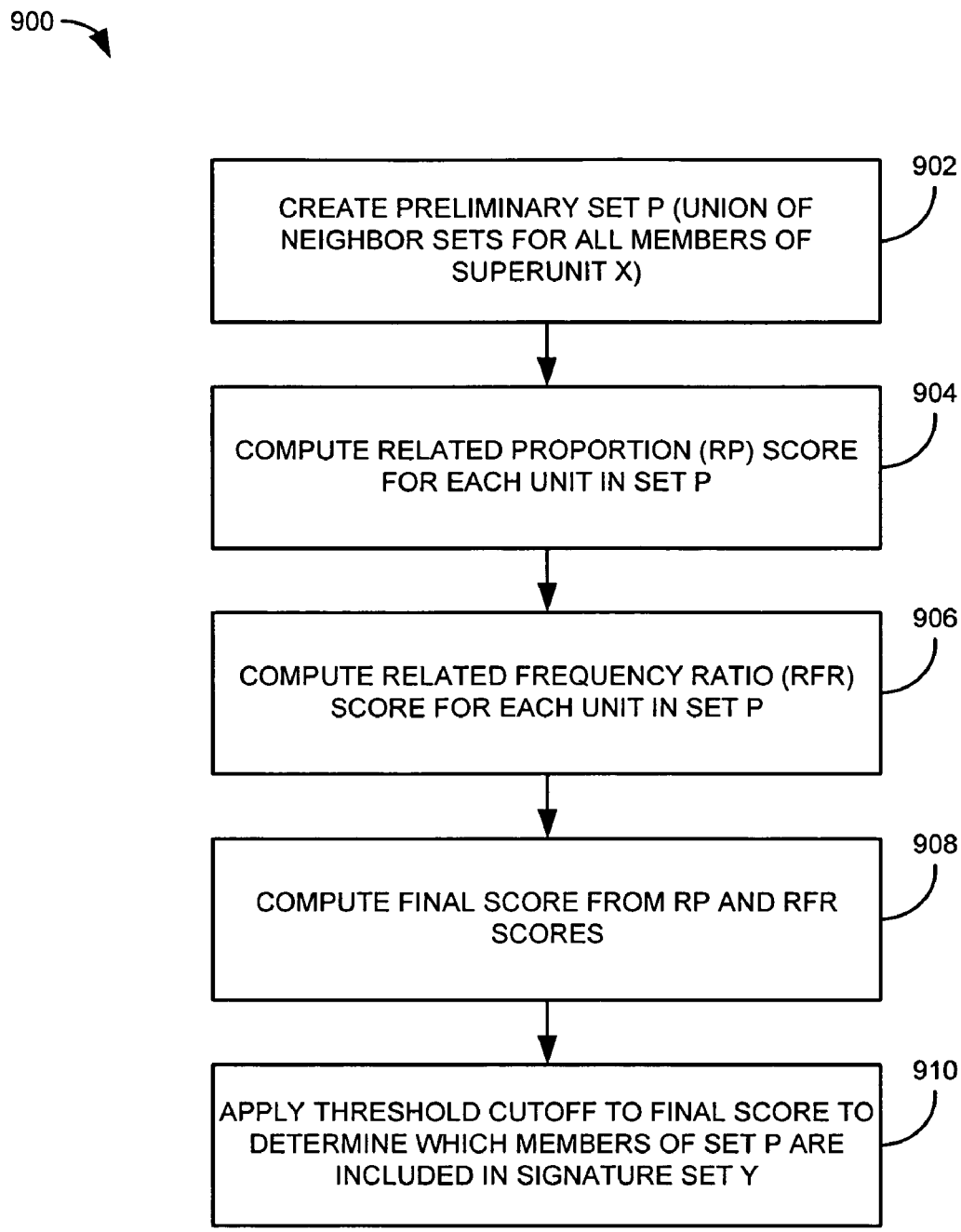
FIG. 9 is a flow diagram of a process for constructing a signature set for a superunit according to an embodiment of the present invention.

A signature was then created for the superunit seed (step 704). An example of a signature generation process of the kind used for the "drug" superunit is shown in FIG. 9 as process 900. At step 902, a preliminary signature set P is formed, where set P is the union of the set $V(x_i)$ of neighbors of each of the member units $x_i$ of the superunit set X. In some embodiments, the set $V(x_i)$ may include fewer than all neighbors of the member units $x_i$; for example, a minimum edge weight or a particular type of relationship may be required, or the set may be culled to remove duplicative units (e.g., only one of "map of spain" or "spain map" might be kept).

At step 904, a first score is computed for each unit $p_j$ in preliminary signature set P. The first score for a unit $p_j$ advantageously reflects the likelihood that a member $x_i$ of superunit set X will be a neighbor of unit $p_j$. In the "drug" superunit example, the first score for unit $p_j$ was a "related proportion" (RP) score based on the membership weights $W(x_i)$ of the units $x_i$ that are neighbors of the unit $p_j$. For example, if $L(x_i, p_j)$ is defined as being equal to 1 if unit $x_i$ is a neighbor of unit $p_j$ and equal to 0 otherwise, the RP score can be computed as:

$$RP(p_j) = \frac{1}{N[X]} \sum_{i=1}^{N[X]} L(x_i, p_j) * W(x_i), \qquad (7)$$

where N[X] denotes the total number of member units in superunit set X.

At step 906, a second score is computed for each unit $p_j$ in preliminary signature set P. The second score for a unit $p_j$ advantageously reflects the likelihood that a neighbor unit of potential signature unit $p_j$ (i.e., a member of neighbor set $V(p_j)$) is also a member of superunit set X. In the "drug" superunit example, the second score was a related frequency ratio (RFR) given by:

$$RFR(p_j) = 100 * \rho[V(p_j), X] / \rho[V(p_j)], \qquad (8)$$

where $\rho[V(p_j), X]$ denotes the sum of the frequencies (or edge weights) of relationships between members of neighbor set $V(p_j)$ and member units of set X, and $\rho[V(p_j)]$ denotes the aggregate frequency of all members of neighbor set $V(p_j)$.

At step 908, a final score $S_f(p_j)$ is computed for each unit $p_j$ in preliminary set P by combining the first and second scores. In the example of a "drug" superunit, using the RP and RFR scores defined above in equations (7) and (8), respectively, the final score was given by:

$$S_f(p_j) = RP(p_j) * \log RFR(p_j). \qquad (9)$$

In other embodiments, the final score $S_f(p_j)$ may be a different combination of the RP and RFR scores.

At step 910, a threshold value is applied to the final score $S_f(p_j)$, and units $p_j$ with scores above the threshold became the signature units $y_j$ of signature set Y for superunit X. In the "drug" superunit example, the threshold was determined by dividing the maximum value of $S_f(p_j)$ for any unit $p_j$ by a constant value; in this case a constant value of 6 was used, but other values may also be selected. For each unit $y_j$ included in signature set Y, the final score $S_f(y_j)$ was saved as a membership weight $W(y_j)$.

After the signature was generated, candidate units $c_k$ were tested for possible addition to superunit set X (step 708 of process 700), thereby creating a modified superunit X'.

These candidate units $c_k$ were selected from units that were neighbors of at least one signature unit $y_j$ (where $y_j$ is a member of set Y) and that were not already members of set X or set Y. For each candidate unit $c_k$, a membership score was computed, based in part on the neighbor units $V(c_k)$ of the candidate unit $c_k$ and the signature units $y_j$ in signature set Y. Computation of membership scores for superunit members was generally similar to process 900 described above for signatures, and the scores themselves were defined similarly.

More specifically, one score was a related proportion score defined similarly to equation (7) above. That is, if $L(y_j, c_k)$ is defined as being equal to 1 if unit $y_j$ is a neighbor of unit $c_k$ and equal to 0 otherwise, the RP score for candidate unit $c_k$ was defined as:

$$RP(c_k)=(1/N[Y])*\text{Sum}[L(y_j, c_k)*W(y_j)], \quad (10)$$

where $N[Y]$ is the total number of units $y_j$ in signature set Y and $W(y_j)$ is the membership score (the result of equation (9) as noted above) for the unit $y_j$. The second score was a related frequency ratio score defined similarly to equation (8) above. That is, if $V(c_k)$ denotes the set of all neighbor units of candidate unit $c_k$, $\rho[V(c_k),Y]$ denotes the sum of the frequencies or edge weights of relationships between members of neighbor set $V(c_k)$ and signature units in signature set Y, and $\rho[V(c_k)]$ denotes the aggregate frequency of all members of neighbor set $V(c_k)$, then:

$$RFR(c_k)=100*\rho[V(c_k),X]/\rho[V(c_k)]. \quad (11)$$

The final score $S_f(c_k)$ was determined by combining the RP and RFR scores; i.e.,:

$$S_f(c_k)=RP(c_k)* \log RFR(c_k), \quad (12)$$

similarly to equation (9) above. A threshold was applied to the final score $S_f(c_k)$ to determine whether candidate $c_k$, should be added to superunit set X'. This threshold was determined by dividing the maximum value of $S_f(c_k)$ over all candidate units $c_k$ by a constant value; in this case, a constant value of 6 was used, but other values might also be selected. For each candidate $c_k$ that was added as a unit $x_i$, its membership weight $W(x_i)$ was set equal to its final score. This membership weight was used in the next iteration of the signature updating step 710 of process 700.

After all candidates were processed, the superunit generation process continued to step 710 where signature set Y was updated to a new set Y' based on the membership of updated superunit set X'. This was done by re-executing process 900 using the current membership of superunit set X'. Then, at step 712, member units of superunit set X' were evaluated to determine whether they should be removed; this process used the same score computations and membership criteria as step 708.

At step 714, convergence or non-convergence was determined by comparing sets X' and Y' to sets X and Y, respectively. No change, or a sufficiently small change, between each pair of sets results in convergence.

FIG. 10 shows results for the "drug" superunit. As noted above, the seed was a clique based on a single brand name (VICODIN); signature weights were determined by equations (7), (8), and (9) above; and superunit membership weights were determined by equations (10), (11), and (12) above. FIG. 10A shows the signature units and their respective membership weights, after eight iterations, and FIG. 10B shows some of the superunit members and their respective weights, also after eight iterations. These results were generated from a large number of actual user queries, and the full superunit includes over a hundred members, representative ones of which are shown.

For this example, the signature set consisted of the six units listed in FIG. 10A. It should be noted that these are units that one might expect a person to include when searching for information about a drug and not to include in searches not related to a drug. The superunit members, some of which are shown in FIG. 10B, included a large number of brand names of various medications. (Aside from "Vicodin", which is the base unit around which the superunit seed was formed, these brand names are listed in FIG. 10B as <brand A>, etc., since the particular brands and their ordering are not pertinent to the present invention.) It also includes generic names for drugs (e.g., "ibuprofen", "drug", "caffeine"), illegal drugs (e.g., "heroin"), food additives (e.g., "aspartame", as well as several different vitamins (not listed)), and other drug-related terms (e.g., "chemotherapy").

It is to be understood that this example is illustrative and that variations and modifications are possible and that superunit members, signature units, and/or scores will generally vary from those mentioned in this example, e.g., if a different concept network is used as the input. Further, the formulas described for signature and superunit membership scores are illustrative and may be varied as desired.

For instance, in some embodiments, scores for potential signature units can be computed without reference to membership weights $W(x_i)$ of the superunit members. In one such embodiment, where $N[X \cap V(p_j)]$ denotes the number of members of superunit set X that are also members of neighbor set $V(p_j)$ of a unit $p_j$ and $N[X]$ denotes the total number of members of superunit set X, a first score $S_1$ for unit $p_j$ reflecting the likelihood that a member of superunit set X is a neighbor of unit $p_j$ may be computed as:

$$S_1(p_j)=N[X \cap V(p_j)]/N[X]. \quad (13)$$

Similarly, a second score for unit $p_j$, reflecting the likelihood that a neighbor unit of the unit $p_j$ is a member of superunit set X, may be computed as:

$$S_2(p_j)=\rho[V(p_j),X]/\rho[V(p_j)], \quad (14)$$

where $\rho[V(p_j),X]$ and $\rho[V(p_j)]$ are defined as above. As another example the second score for unit $p_j$ may be computed as:

$$S_2'(p_j)=N[V(p_j) \cap X]/N[V(p_j)], \quad (15)$$

where $V(p_j)$ denotes the set of neighbor units of a unit $p_j$, $N[V(p_j) \cap X]$ denotes the number of units in neighbor set $V(p_j)$ for unit $p_j$ that are also members of X, and $N[V(p_j)]$ denotes the total number of neighbor units in neighbor set $Y(p_j)$.

First and second scores may be combined in any manner desired to determine a final score for purposes of applying a threshold for inclusion in signature set Y. Alternatively, a separate cutoff may be applied to each score individually; e.g., a unit $p_j$ is a member unit $y_j$ of signature set Y if $S_1(p_j)>t_1$ and $S_2(p_j)>t_2$ for some threshold values $t_1$, $t_2$. If separate cutoffs on two scores are used, both scores may be saved as membership weights.

It will be appreciated that analogous scores for candidate units $c_k$ considered for inclusion in superunit X may be computed similarly. For example, if $N[V(c_k) \cap Y]$ denotes the number of neighbor units of candidate $c_k$ that are signature units in set Y, $N[V(c_k)]$ denotes the total number of neighbor units of candidate unit $c_k$, and N[Y] denote the total number of signature units Y, then two membership scores $S_1$ and $S_2$ can be defined as:

$$S_1(c_k) = N[V(c_k) \cap Y]/N[V(c_k)] \qquad (16)$$

and $$S_2(c_k) = N[V(c_k) \cap Y]/N[Y], \qquad (17)$$

similarly to equations (13) and (15) above. A definition in terms of frequency may also be used for either or both scores. Whether to add a candidate unit $c_k$ can be determined based on either or both of the individual scores or a combination thereof.

As noted above, all neighbors of a candidate unit for either the superunit or signature need not be considered. The candidate units can be restricted, e.g., based on a specific relationship (e.g., only extensions), a minimum edge weight, or other criteria. In one embodiment, the neighbor units used are the "suggestions" for the candidate unit, where suggestions are identified using techniques described in detail in above-referenced application Ser. No. 10/713,576.

It will be appreciated that the superunit construction process described herein is illustrative and that variations and modifications are possible. Steps described as sequential may be executed in parallel, order of steps may be varied, and steps may be modified or combined. Multiple superunits may be constructed in parallel (or sequentially) starting from any number of seeds. In addition, varying sets of superunits may be constructed from the same concept network (and optionally the same seeds) by using different criteria for membership in the superunit and/or signature, thereby generating superunits with different content. Moreover, while examples described above refer to association relationships, other types of relationships between superunit members and signature units may be considered. Also, the examples above considered only signature units that are immediate neighbors of the member units; other embodiments might select signature units based on indirect relationships, co-occurrences of more than two units in queries, and so on.

In some aspects, the superunit construction process is an extension of cluster generation process 500 (FIG. 5) described above. As used herein, a "cluster" refers to a group of units that are related based on similarities of their neighborhoods (i.e., associated units); in that sense, a cluster may be regarded as a type of superunit, with the signature being defined based on the common neighborhood. It will be appreciated that other types of superunits may also be created to capture other types of relationships, including direct relationships among a superunit's members. For example, the units "britney spears" and "brittany spears" (a common misspelling) are likely to have a common neighborhood and to be included in a cluster-type superunit along with units such as "barbra streisand" and "celine dion" that clearly refer to other singers. To capture the special relationship between the correct spelling "britney spears" and various incorrect spellings, a superunit of alternatives may be created. The signature of this type of superunit might include the presence of an "alternative" relationship with some number of other members (or with a single "preferred" member) as well as (or instead of) the common neighborhood.

Referring again to FIG. 4, query engine 404 is advantageously configured to perform its query processing operations on a recurring basis (e.g., weekly, daily, hourly, in real-time as queries are received, etc.). In some embodiments, an existing unit dictionary is updated based on queries received in a new set of query log files; in other embodiments, a new unit dictionary may be generated from scratch from the new set of query log files. In either case, it will be appreciated that the concept network and the superunits can evolve naturally in response to changing user behavior. For instance, if a new singer becomes popular, he or she would likely become part of superunit X in FIG. 8 because users would likely start searching for the new singer's name in conjunction with the signature units of superunit X.

In preferred embodiments, the superunits tend to reflect real-world relationships of concepts (e.g., units that belong to a category such as singers or cities), even though query processing engine 404 need not be provided with real-world knowledge or semantic information about units or queries. For example, one superunit might include "New York City", "San Francisco", and "Chicago", and the signature for that superunit might include "hotel", "restaurant", and "night club". Such a superunit would reflect that New York City, San Francisco, and Chicago are all tourist destinations (or cities), but query engine 404 (FIG. 4) is not required to possess any prior knowledge of the concept "destination" (or "city"). This conceptual knowledge can grow automatically from analyzing patterns of queries. It is to be understood that where the present specification labels superunits with terms that carry semantic meaning to humans, this is a convenience to facilitate understanding of the present disclosure. In practice, any superunit labeling scheme used by query engine 404 or unit dictionary 406 need not have this property; for instance, a superunit label could simply be a number, a reference to a weight vector or signature for the superunit, and so on.

In some embodiments, superunits may be further enhanced by assigning semantically meaningful labels to some or all of the superunits. For example, a categorized keyword database that associates a label (e.g., "artist") with one or more keywords (e.g., "lyrics", "mp3", etc.) can be provided for use in assigning labels. The signature units of a superunit might be compared to the keywords to decide whether to apply the label. Human index editors may participate in this process, e.g., by building the keyword database and/or verifying assignments of labels to superunits.

A unit might belong to multiple superunits; for example, an ambiguous unit such as "java" could end up in a "computer programming" superunit, a "food and drink" superunit, and a "travel" or "places" superunit. In some embodiments, there may also be units that do not belong to any superunit. The number of superunits to be created may be established in advance (either as a specific number or a range of numbers), and may be, e.g., 100, 500, 1500, or 5000. In other embodiments, the number of superunits is not predetermined.

It is to be understood that the systems and processes described herein are illustrative and that variations and modifications are possible. Process steps described as sequential may be executed in parallel, steps may be combined, and order of steps may be modified. For example, the set of units considered as candidates for membership in superunits may be restricted in various ways (e.g., by limiting candidates to units that occur relatively frequently), and the set of signature units may also be restricted. In one embodiment, signature units might include or be limited to "suggestions" associated with at least one of the members of the superunit. Suggestions, in this context, are units that have been identified as likely things that a user who typed in a particular query (or unit) might be interested in and are based on an analysis of units and frequency information. Techniques for generating suggestions are described in detail in the above-referenced U.S. application Ser. No. 10/713,576.

III. Applications of Superunits in Query Responses

Figure 11:
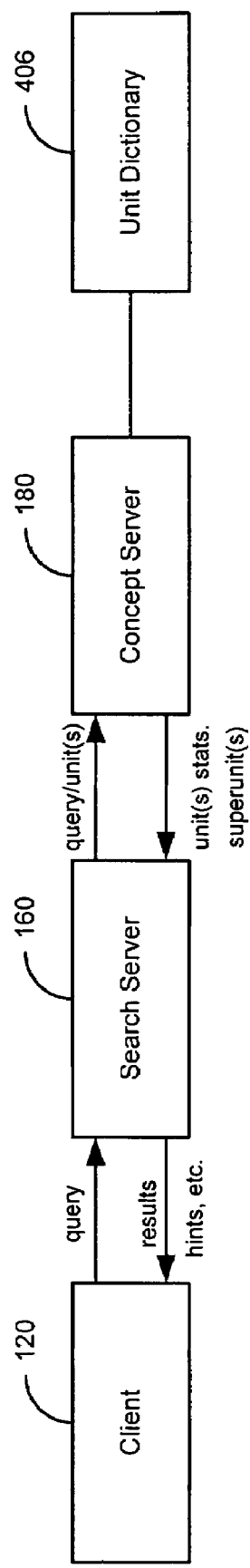
FIG. 11 is a simplified block diagram of a system including a unit dictionary and associated processing intelligence, including a query processing engine in some aspects, according to an embodiment of the present invention.

Superunit information may be used in various ways to enhance a response to a query. FIG. 11 shows a methodology that can be used by system 110 of FIG. 2 to respond to a query. Client 120 transmits a query to search server system 160. Search server system 160 sends the query and/or its constituent units to a concept server 180, which accesses unit dictionary 406. Concept server 180 returns conceptual data related to the query, such as one or more units identified from the query along with statistics and superunit information for the various units. This information may be derived, e.g., by hashing the query to identify units contained therein and accessing unit dictionary 406 to retrieve entries for each identified unit. In this embodiment, unit dictionary 406 includes any information about the units that is to be made available during query processing and may include a representation of a concept network in full or in part. In one embodiment, the returned information includes information about superunit(s) associated with the query or individual units thereof.

Search server system 160 advantageously uses the conceptual data received from concept server 180 in responding to the query. The results returned by search server system 160 advantageously include results responsive to the user's query along with other related information, such as hints and tips about what the user might want to explore next based on understanding of user needs as captured in units and their relationships, including superunits. Several examples of ways in which superunit information can be used to respond to a query will now be described; it is to be understood that these examples are illustrative and not restrictive.

A. Resolving Ambiguity

In some embodiments, search server system 160 may use constituent units of a multi-unit query to resolve an ambiguity in one of the constituent units. For example, suppose that a query includes an ambiguous term, such as "Java," that might be used in more than one context. Such a term might belong to multiple superunits, e.g., a "food and drink" superunit, a "computer" superunit, and a "location" superunit. After parsing the query into units and detecting the ambiguity in the unit "java", search server 160 can compare the other constituent units of query to the signature of each such superunit. Thus, if the query also includes a term such as "shop" or "coffee", search server system 160 might infer that the user is most likely interested in the "food and drink" superunit, while terms such as "program" or "script" would indicate the "computer" superunit, and so on. Results (e.g., links to pages responsive to the query) could be presented in groups corresponding to the different superunits, with the most likely superunit appearing first. In another embodiment, results from different superunits (or contexts) could be arranged on different "tabs" of the result page, allowing the users to select a context by clicking on the desired tab. The most likely context may be displayed by default.

Superunits may also be used to resolve ambiguity in other ways, e.g., by examining other queries the user may have made in the same session. For example, the unit "jaguar" may refer to an animal or to a car. If the user's query previous to "jaguar" was related to automobiles but not to animals (e.g., "kelly blue book" or "porsche"), it can be inferred that the user is more likely to be interested in automobiles than in animals. Such an inference can be automated by examining superunit membership of units in different queries entered by the same user; a superunit that has both units as member can be identified as more likely than one that does not. Any number of the user's previous queries may be considered, e.g., with the most recent queries given greater weight.

Search server system 160 may use various techniques to determine how to group the results. For example, the search-related algorithm that generates the page index (e.g., page index 170 of FIG. 2) may be configured to use existing superunit data from unit dictionary 406 to assign each page or site (or other unit of content) in the index to one or more of the superunits; the superunit assignments may be stored in the index (e.g., as a context identifier 172) along with other data related to the occurrence of particular terms or units.

B. Suggesting Related Searches

In some embodiments, search server system 160 might suggest related searches based on superunit information. For instance, suppose that a query includes "New York City" and that this unit is known to belong to a "destination" superunit. Search server system 160 might use the signature associated with the superunit to suggest additional searches, such as searches for "restaurant" or "hotel" in conjunction with "New York City." Such suggestions might be based, e.g., on the signature units of the superunit.

C. Suggesting "Sideways" Searches

In some embodiments, search server system 160 might also use superunit information to suggest "sideways" searches of similar or related sites. For example, suppose a user is interested in flying from point A to point B on day W. The user may directly access an airline site, e.g., an American Airlines site, and perform a search within that site, or the user may request a search for "airlines" or "air travel" or "American airlines" or the like, access a specific site from a link in the search results displayed (e.g., the American Airlines site) and request information about a flight or flights from point A to point B on day W within the accessed site. The user is now viewing information from American Airline's site about the requested information, including, perhaps, pricing information related to the various flights available. A "sideways" search enables the user to search another site using the same information, e.g., points A and B and day W, to obtain similar results without having to manually access the new site and re-enter the desired information.

In one embodiment of the present invention, search server system 160 can prompt the user to perform sideways searches on suggested "related" sites, using superunit information to identify the related sites. For instance, the unit "American airlines" may belong to an "airline" or "transportation" superunit; search server system 160 can identify other units in that superunit (e.g., "United Airlines") and suggest running the search on a site associated with that unit. If the user selects the sideways search, the system interfaces with the identified site to provide the desired search results, for example, a page at the identified site that lists pricing information for flights from point A to point B on day W. In cases where the user has directly accessed a site and entered search information into a form associated with the accessed site, the search module 126 stores this input information and uses such information where necessary for filling out forms in the related sites when a sideways search is requested. The user may, of course, need to enter additional information at a new site depending on the requirements of the selected site. In this manner the user is provided with the ability to streamline similar searches across different websites for similar information.

D. Resolving Spelling Errors

In some embodiments, superunits and signatures may be used to provide enhanced spell checking during query processing. For example, if a user enters a query that includes "basset", conventional search server systems might recognize that "bassett" or "basket" are possible alternatives and may suggest either or both to the user. Search server 160, which has access to superunit data, is able to leverage the concept network to determine which alternative spelling was most likely intended by the user.

For example, suppose that previous queries including "basset" have a signature closer to "bassett" than to "basket" (e.g., because "basset" appears with "hound" far more frequently than with "weaving"). In this case, the search server might suggest "basset" as the best alternative form. In another implementation, the complete query might be compared against the respective signatures associated with one superunit that contains "basket" and another superunit that contains "bassett", with a suggestion being made based on which signature matched the query more closely. Thus, search server 160 might respond to the query "basset hound" with a suggestion to search for "bassett hound" and respond to the query "basset weaving" with a suggestion to search for "basket weaving".

E. Supporting Directory-Based Searching

In further embodiments, superunit information may be used to construct a hierarchical categorization of units. In one embodiment, multiple phases of superunit construction are performed. In the first phase, relatively strict membership criteria may be used, thereby creating superunits that represent low levels of the hierarchy. For instance, a "cities" superunit, a "states" superunit, and a "nations" superunit might be constructed at this phase. In a later phase, superunits may be constructed again (optionally with less strict criteria) starting from the initial set of superunits, thereby creating higher-level superunits (such as a "places" superunit that includes cities, states, and nations). Alternatively, different stages in an iterative superunit construction process (e.g., process 700 of FIG. 7) may be used to identify different levels of hierarchy.

A hierarchical categorization based on superunits might be used to provide directory-based search functionality similar to that presently offered by Yahoo! and other search service providers. Conventional directory-based search systems rely exclusively on human editorial teams to construct the directory; constructing a directory from superunits makes the process automatic and can result in a directory that adapts more rapidly to changing user interests and behavior.

F. Other Applications

Superunits may also be used in other ways. For instance, in some embodiments a website operator or other entity can "sponsor" a superunit so that an advertisement provided by the sponsor (or just a link to the sponsor's site) is prominently displayed whenever a query includes a unit associated with the sponsored superunit. In other embodiments, terms in a query may be compared to superunit names, and related searches for other members of the superunit might be suggested. In still other embodiments, if a query term matches a superunit name, pages relevant to other query terms might be ranked based on whether the context corresponds to the superunit.

IV. Further Embodiments

While the invention has been described with respect to specific embodiments, one skilled in the art will recognize that numerous modifications are possible. For instance, the number and specificity of superunits may vary, and a unit may belong to more than one superunit. Depending on implementation, it might or might not be required that every unit belong to at least one superunit. Superunits and signatures can be defined dynamically, and concept discovery and/or concept analysis can be performed from time to time (e.g., daily or weekly) to update unit, superunit, and/or signature data in response to changing user behavior. As mentioned above, a variety of techniques for identifying and relating units in order to create superunits may be used. While superunits may tend to reflect real-world relationships of concepts, there is no requirement that all superunits (or any superunits) do so to any particular degree. In addition, the superunits need not reflect a hierarchical directory structure or other categorization established from real world knowledge such as the Yahoo! directory. The automated systems and methods described herein may be augmented or supplemented with human review of all or part of the resulting unit dictionary, superunits, signatures, superunit assignments of particular indexed pages or sites, and the like.

The embodiments described herein may make reference to web sites, links, and other terminology specific to instances where the World Wide Web (or a subset thereof) serves as the search corpus. It should be understood that the systems and processes described herein can be adapted for use with a different search corpus (such as an electronic database or document repository) and that results may include content as well as links or references to locations where content may be found.

Thus, although the invention has been described with respect to specific embodiments, it will be appreciated that the invention is intended to cover all modifications and equivalents within the scope of the following claims.

What is claimed is:

1. A computer-implemented method for generating superunits from a concept network, the concept network including a plurality of units and a plurality of relationships defined between pairs of the plurality of units, wherein each relationship has an associated edge weight, the method comprising the acts of:

identifying a superunit seed comprising at least one member unit, wherein each member unit is one of the plurality of units of the concept network;

defining a signature for the superunit seed, the signature including one or more signature units, wherein each signature unit has a relationship in the concept network with at least a minimum number of the member units;

expanding the superunit seed by adding one or more new member units from the concept network, wherein each new member unit satisfies a match criterion based on the signature;

modifying the signature based on the expanded superunit seed;

repeating the acts of expanding and modifying until a convergence criterion is satisfied, wherein a final superunit and a final signature are formed once the convergence criterion is satisfied; and storing superunit membership information for each member unit of the final superunit.

2. The method of claim 1, wherein the concept network is generated from a set of previous search queries.

3. The method of claim 1, wherein the act of storing the superunit membership information includes the acts of:
  computing a membership weight for each member unit of the final superunit, wherein the membership weight is based on the relationships in the concept network between the member unit and the signature units of the final signature,
  wherein the stored superunit membership information includes the membership weight.

4. The method of claim 1, further comprising the act of generating the concept network from the previous queries.

5. The method of claim 1, further comprising the acts of:
  subsequently to the act of modifying the signature and prior to the step of repeating, purging the superunit seed by removing a member unit that does not satisfy the match criterion based on the modified signature,
  wherein the act of purging is repeated subsequently to repeating the step of modifying.

6. The method of claim 1, wherein the convergence criterion is satisfied if, as a result of the act of repeating, membership of the superunit seed changes by no more than a maximum number of units.

7. The method of claim 1, wherein the convergence criterion is satisfied if, as a result of the act of repeating, membership of the signature changes by no more than a maximum number of units.

8. The method of claim 1, wherein the act of identifying the superunit seed includes the act of forming a cluster of two or more units as the superunit seed, wherein each unit in the cluster has at least one neighbor unit in common with a base unit of the cluster.

9. The method of claim 8, wherein the act of forming the cluster includes the acts of:
  selecting a base unit and a candidate unit from the concept network;
  identifying a plurality of neighbor units of the base unit, wherein each neighbor unit has a relationship in the concept network to the base unit;
  identifying at least one of the neighbor units as a matched unit, wherein each matched unit has a relationship in the concept network to the candidate unit;
  computing a clustering weight for the candidate unit based on the plurality of neighbor units including the at least one matched unit; and
  based on the clustering weight, determining whether to include the candidate unit in a cluster with the base unit.

10. The method of claim 1, wherein the act of identifying the superunit seed includes forming a clique of two or more closely related units.

11. The method of claim 1, wherein the act of identifying the superunit seed includes the act of receiving a list of units from an external source, the list of units being usable as a superunit seed.

12. The method of claim 11, wherein the external source comprises a web page.

13. The method of claim 11, wherein the act of identifying the superunit seed further includes the act of pruning the list of units to remove a unit that is not in the concept network.

14. The method of claim 1, wherein the act of identifying the superunit seed includes the acts of:
  receiving user behavior data related to the previous queries; and
  detecting similarities in the user behavior data related to previous queries containing different units.

15. The method of claim 14, wherein the user behavior data includes click through information for the previous queries.

16. The method of claim 1, wherein the act of identifying the superunit seed includes the acts of:
  detecting occurrences of units of the concept network in a source document; and
  generating a superunit seed based on the detected occurrences.

17. The method of claim 1, wherein the relationships between the units of the concept network include one or more of an association relationship, an extension relationship, and an alternative relationship.

18. The method of claim 1, wherein the act of defining the signature includes the acts of:
  identifying as the signature units a plurality of units in the concept network that have a specified relationship with at least a minimum number of the member units of the associated superunit seed; and
  establishing a threshold number,
  wherein the step of expanding the superunit seed includes:
    a candidate unit from the concept network; and
    adding the candidate unit to the superunit seed in the event that the candidate unit has the specified relationship with at least the threshold number of the signature units.

19. The method of claim 18, wherein the threshold number is established relative to a total number of signature units by reference to a predetermined fraction.

20. The method of claim 1, wherein defining the signature includes the acts of:
  identifying as the signature units a plurality of units in the concept network that have a specified relationship with at least a minimum number of the member units of the associated superunit seed;
  establishing an edge weight range for each signature unit; and
  establishing a threshold number,
  wherein the step of expanding the superunit seed includes:
  selecting a candidate unit from the concept network;
    determining a first number equal to a number of the signature units with which the candidate unit has the specified relationship and has an edge weight within the edge weight range for that signature unit; and
    adding the candidate unit to the superunit seed in the event that the first number is equal to or greater than the threshold number.

21. The method of claim 1, further comprising, subsequently to the act of storing, the acts of:
  receiving a current query;
  parsing the current query into one or more constituent units;
  retrieving the stored superunit membership information for one or more of the constituent units; and
  formulating a response to the current query based at least in part on the retrieved superunit membership information.

22. The method of claim 21, wherein the act of formulating the response includes the act of using the superunit membership information to suggest a related search query.

23. The method of claim 22, wherein the related search query includes a first unit that is one of the member units of the superunit, wherein the first unit is not a constituent unit of the current query.

24. The method of claim 22, wherein the related search query includes a first unit that is one of the signature units of the superunit, wherein the first unit is not a constituent unit of the current query.

25. The method of claim 21, wherein the act of formulating the response includes the act of using the superunit membership information to suggest a web site for a sideways search.

26. The method of claim 21, wherein one of the constituent units is a member of more than one superunit and wherein the act of formulating the response includes the act of using the superunit membership information to group response data according to the superunits to which the one of the constituent units belongs.

27. The method of claim 21, wherein the act of formulating the response includes the act of using the superunit information to resolve an ambiguity of a first one of the constituent units based on comparing another of the constituent units to signature units for one or more superunits of which the first constituent unit is a member.

28. The method of claim 21, wherein the act of formulating the response includes the act of using the superunit information to select sponsored content to be displayed.

29. A system for generating superunits from user search queries, the system comprising:
a concept network builder module executed by a processor and configured to generate a concept network from a plurality of previous queries, the concept network including a plurality of units and a plurality of relationships defined between pairs of the plurality of units, wherein each relationship has an associated edge weight;
a superunit seed module executed by the processor and configured to identify a superunit seed comprising at least one member unit, wherein each member unit is one of the plurality of units of the concept network;
a superunit builder module executed by the processor and configured to construct superunits and signatures starting with the superunit seeds, wherein each superunit includes a plurality of member units and wherein each signature is associated with one of the superunits, wherein each signature includes one or more signature units, wherein each signature unit has a relationship in the concept network with at least a minimum number of the member units of the associated superunit; and
a storage module executed by the processor and configured to store superunit membership information for the member units, wherein the superunit membership information is provided by the superunit builder module.

30. The system of claim 29, wherein the superunit builder module is further configured to define a signature for each superunit seed, to expand the superunit seed by adding one or more new member units from the concept network, wherein each new member unit satisfies a match criterion based on the signature, to modify the signature based on the expanded superunit seed, and to repeat the steps of expanding and modifying until a convergence criterion is satisfied, wherein a final superunit and a final signature are formed once the convergence criterion is satisfied.

31. The system of claim 30, wherein the superunit builder module is further configured to compute a membership weight for each member unit of the final superunit, wherein the membership weight is based on the relationships in the concept network between the member unit and the signature units of the final signature, and to store the membership weight in the storage module.

32. The system of claim 30, wherein the convergence criterion is satisfied if, during the repetition, membership of the superunit seed changes by less than a maximum number of units.

33. The system of claim 30, wherein the convergence criterion is satisfied if, during the repetition, membership of the signature changes by less than a maximum number of units.

34. The system of claim 29, wherein the superunit seed module is further configured to identify a cluster of two or more units as the superunit seed, wherein each unit in the cluster has at least one neighbor unit in common.

35. The system of claim 34, wherein the superunit seed module is further configured to select at least two candidate units from the concept network, to identify a plurality of neighbor units of the candidate units, wherein each neighbor unit has a relationship in the concept network to one or more of the candidate units, to compute a clustering weight for the candidate units based on the plurality of neighbor units, and to determine, based on the clustering weight, whether to form a cluster from the candidate units.

36. The system of claim 34, wherein the superunit seed module is further configured to receive a list of units from an external source, the list of units being usable as a superunit seed.

37. The system of claim 34, wherein the superunit seed module is further configured to receive user behavior data related to the previous queries and to detect similarities in the user behavior data related to previous queries containing different units.

38. The system of claim 34, wherein the superunit seed module is further configured to detect occurrences of units of the concept network in a source document and to generate a superunit seed based on the detected occurrences.

39. The system of claim 29, further comprising:
a query response module coupled to the storage module and configured to receive a current query, to parse the current query into one or more constituent units, to retrieve from the storage module the superunit membership information for one or more of the constituent units, and to formulate a response to the current query based at least in part on the retrieved superunit membership information.

40. A computer program product comprising a computer readable medium encoded with program code executable by a processor, the program code including:
program code for identifying a superunit seed comprising at least one member unit, wherein each member unit is one of a plurality of units of a concept network, the concept network including a plurality of units and a plurality of relationships defined between pairs of the plurality of units, wherein each relationship has an associated edge weight;
program code for defining a signature for the superunit seed, the signature including one or more signature units, wherein each signature unit has a relationship in the concept network with at least a minimum number of the member units;
program code for expanding the superunit seed by adding one or more new member units from the concept network, wherein each new member unit satisfies a match criterion based on the signature;
program code for modifying the signature based on the expanded superunit seed;
program code for repeating the steps of expanding and modifying until a convergence criterion is satisfied, wherein a final superunit and a final signature are formed once the convergence criterion is satisfied; and program code for storing superunit membership information for each member unit of the final superunit.

41. The computer program product of claim 40, wherein the program code further includes:

program code for receiving a current query;

program code for parsing the current query into one or more constituent units;

program code for retrieving the stored superunit membership information for one or more of the constituent units; and program code for formulating a response to the current query based at least in part on the retrieved superunit membership information.

42. A computer-implemented method for forming a cluster from a concept network, the concept network including a plurality of units and a plurality of relationships defined between the units, wherein each relationship has a associated edge weight, the method comprising the acts of:

selecting a base unit and a candidate unit from the concept network;

identifying a plurality of neighbor units of the base unit, wherein each neighbor unit has a relationship in the concept network to the base unit;

identifying at least one of the neighbor units as a matched unit, wherein the matched unit has a relationship in the concept network to the candidate unit;

computing a clustering weight for the candidate unit based on the plurality of neighbor units including the at least one matched unit; and based on the clustering weight, determining whether to include the candidate unit in a cluster with the base unit.

43. The method of claim 42, further comprising the acts of:

selecting a second candidate unit; and using the second candidate unit repeating the acts of identifying at least one of the neighbor units as a matched unit, computing a clustering weight, and determining, thereby determining whether to include the second candidate unit in the cluster.

44. A computer-implemented method for forming a clique from a concept network, the concept network including a plurality of units and a plurality of relationships defined between the units, wherein each relationship has an associated edge weight, the method comprising the acts of:

forming a plurality of clusters, wherein each cluster includes at least a base unit;

selecting one of the plurality of clusters as a starting cluster;

initializing a clique to include only the base unit of the starting cluster; and for each member unit u of the starting cluster, adding the member unit u to the clique upon determining that:

(a) the fraction of current members of the clique that are also members of the one of the clusters that has member unit u as the base unit is equal to or greater than a first threshold value; and (b) the fraction of clusters having current clique members as base units that also include member unit u is equal to or greater than a second threshold value.

45. The method of claim 44, wherein the first threshold value and the second threshold value are each equal to 100%.

46. The method of claim 44, wherein the first threshold value and the second threshold value are each equal to about 70%.

* * * * *